(12) United States Patent
Gschwind

(10) Patent No.: US 10,747,532 B2
(45) Date of Patent: *Aug. 18, 2020

(54) SELECTING PROCESSING BASED ON EXPECTED VALUE OF SELECTED CHARACTER

(71) Applicant: INTERNATIONAL BUSINESS MACHINES CORPORATION, Armonk, NY (US)

(72) Inventor: Michael K. Gschwind, Chappaqua, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/401,131

(22) Filed: May 2, 2019

(65) Prior Publication Data

US 2019/0258483 A1 Aug. 22, 2019

Related U.S. Application Data

(63) Continuation of application No. 16/212,952, filed on Dec. 7, 2018, now Pat. No. 10,372,448, which is a
(Continued)

(51) Int. Cl.
*G06F 9/30* (2018.01)
*G06F 9/38* (2018.01)

(52) U.S. Cl.
CPC ........ *G06F 9/30032* (2013.01); *G06F 9/3005* (2013.01); *G06F 9/3016* (2013.01);
(Continued)

(58) Field of Classification Search
CPC ............ G06F 9/30032; G06F 9/30021; G06F 9/3005; G06F 9/3016
See application file for complete search history.

(56) References Cited

U.S. PATENT DOCUMENTS

| 4,723,206 A | 2/1988 | Kojima |
| 5,465,374 A | 11/1995 | Dinkjian |

(Continued)

FOREIGN PATENT DOCUMENTS

CN 106469186 A 3/2017

OTHER PUBLICATIONS

Anonymous, "Method for Workload-Trained Optimised Object Comparisons," Jul. 2013, pp. 1-4 (+ cover).
(Continued)

*Primary Examiner* — Jyoti Mehta
(74) *Attorney, Agent, or Firm* — Steven Chiu, Esq.; Blanche E. Schiller, Esq.; Heslin Rothenberg Farley Mesiti P.C.

(57) ABSTRACT

An instruction defined to be a looping instruction is obtained and processed. A determination is made as to whether an obtained selected character is an expected selected character. Based on the obtained selected character being the expected selected character, an execution process is used that includes a sequence of operations to perform an operation, the sequence of operations replacing a loop and providing a non-looping sequence to perform the operation on up to a defined number of units of data. The sequence of operations is configured to repeat one or more times and to terminate based on the obtained selected character. Based on the obtained selected character being different than the expected selected character, an alternate execution process is chosen.

12 Claims, 23 Drawing Sheets

Related U.S. Application Data continuation of application No. 15/449,219, filed on Mar. 3, 2017, now Pat. No. 10,324,716.

(52) U.S. Cl.
CPC ...... *G06F 9/30018* (2013.01); *G06F 9/30021* (2013.01); *G06F 9/30174* (2013.01); *G06F 9/3802* (2013.01); *G06F 9/3867* (2013.01)

(56) References Cited

U.S. PATENT DOCUMENTS

| | | | |
|---|---|---|---|
| 5,495,592 | A | 2/1996 | James |
| 5,680,572 | A | 10/1997 | Akkary |
| 5,692,146 | A | 11/1997 | Yamamoto et al. |
| 5,752,015 | A | 5/1998 | Henry |
| 5,781,750 | A | 7/1998 | Blomgren |
| 5,822,602 | A | 10/1998 | Thusoo |
| 5,832,299 | A | 11/1998 | Wooten |
| 5,898,865 | A | 4/1999 | Mahalingaiah |
| 5,931,940 | A | 8/1999 | Shelton |
| 6,145,077 | A | 11/2000 | Sidwell |
| 6,336,178 | B1 | 1/2002 | Favor |
| 6,788,303 | B2 | 9/2004 | Baldwin |
| 6,931,517 | B1 | 8/2005 | Col et al. |
| 7,366,885 | B1 | 4/2008 | Radhakrishnan et al. |
| 7,577,936 | B2 | 8/2009 | Koseki et al. |
| 7,802,078 | B2 | 9/2010 | Henry et al. |
| 7,822,615 | B2 | 10/2010 | Stanfill |
| 7,937,574 | B2 | 5/2011 | Clark et al. |
| 7,991,987 | B2 | 8/2011 | Cabot |
| 8,166,279 | B2 | 4/2012 | Blaner et al. |
| 8,286,148 | B2 | 10/2012 | Broadhurst |
| 8,392,693 | B2 | 3/2013 | Henry et al. |
| 8,549,501 | B2 | 10/2013 | Eichenberger et al. |
| 8,902,087 | B1 | 12/2014 | Kozin et al. |
| 8,938,605 | B2 | 1/2015 | Busaba |
| 9,009,447 | B2 | 4/2015 | Gove |
| 9,250,904 | B2 | 2/2016 | Gschwind et al. |
| 9,268,566 | B2 | 2/2016 | Bradbury et al. |
| 9,286,076 | B2 | 3/2016 | Belmar et al. |
| 9,342,585 | B2 | 5/2016 | Yang et al. |
| 9,383,999 | B2 | 7/2016 | Seal et al. |
| 9,454,367 | B2 | 9/2016 | Bradbury et al. |
| 10,255,068 | B2 | 4/2019 | Gschwind et al. |
| 10,324,716 | B2 | 6/2019 | Gschwind et al. |
| 10,324,717 | B2 | 6/2019 | Gschwind et al. |
| 10,372,447 | B2 | 8/2019 | Gschwind et al. |
| 10,372,448 | B2 | 8/2019 | Gschwind et al. |
| 10,564,965 | B2 | 2/2020 | Gschwind et al. |
| 10,564,967 | B2 | 2/2020 | Gschwind et al. |
| 2002/0087846 | A1 | 7/2002 | Nickolls |
| 2003/0084253 | A1 | 5/2003 | Johnson |
| 2003/0120900 | A1 | 6/2003 | Stotzer et al. |
| 2004/0003381 | A1 | 1/2004 | Suzuki et al. |
| 2004/0230775 | A1 | 11/2004 | Slegel et al. |
| 2005/0283773 | A1 | 12/2005 | Eichenberger |
| 2007/0124722 | A1 | 5/2007 | Gschwind |
| 2008/0040345 | A1 | 2/2008 | Cameron |
| 2009/0006791 | A1 | 1/2009 | Clark |
| 2009/0119494 | A1 | 5/2009 | Blander |
| 2009/0182988 | A1 | 7/2009 | Greiner et al. |
| 2010/0031007 | A1 | 2/2010 | Moudgill |
| 2010/0064122 | A1 | 3/2010 | Henry |
| 2011/0055530 | A1 | 3/2011 | Henry |
| 2013/0024653 | A1 | 1/2013 | Gove |
| 2013/0246758 | A1 | 9/2013 | Bradbury |
| 2014/0136822 | A1 | 5/2014 | Suggs et al. |
| 2014/0189321 | A1 | 7/2014 | Uliel et al. |
| 2014/0281399 | A1 | 9/2014 | Rash et al. |
| 2014/0281435 | A1 | 9/2014 | Perkins et al. |
| 2014/0358965 | A1 | 12/2014 | Sugiyama et al. |
| 2015/0154009 | A1 | 6/2015 | Namba |
| 2015/0178084 | A1 | 6/2015 | Julier et al. |
| 2015/0227374 | A1 | 8/2015 | Balasco et al. |
| 2015/0378674 | A1 | 12/2015 | Ruff |
| 2016/0188480 | A1 | 6/2016 | Greiner et al. |
| 2018/0253300 | A1 | 9/2018 | Gschwind |
| 2018/0253301 | A1 | 9/2018 | Gschwind |
| 2018/0253302 | A1 | 9/2018 | Gschwind |
| 2018/0253303 | A1 | 9/2018 | Gschwind |
| 2018/0253304 | A1 | 9/2018 | Gschwind |
| 2018/0253305 | A1 | 9/2018 | Gschwind |
| 2018/0253306 | A1 | 9/2018 | Gschwind |
| 2018/0253307 | A1 | 9/2018 | Gschwind |
| 2019/0108020 | A1 | 4/2019 | Gschwind |
| 2019/0114171 | A1 | 4/2019 | Gschwind |
| 2019/0258483 | A1 | 8/2019 | Gschwind |
| 2019/0258484 | A1 | 8/2019 | Gschwind |

OTHER PUBLICATIONS

Boonie, Mark, "New and Not-So-New Assembler Instructions—Instructions Your Mother Never Told You About," Apr. 2002, pp. 1-26.

Curran, Brian, "IBM zEnterprise 196 Processor," IBM Corporation, 2010, pp. 1-31.

Ehrman, John R., "Assembler Language Programming for IBM zSystem Servers—Version 1.00," Jan. 2015, pp. 1-1313.

Harper, Kristine, Why Assembler is a 21$^{st}$ Century Language, Dec. 2007, pp. 1-62.

IBM, "Efficient and Convenient Scheme for Storing String Values in a Dynamic Language Implementation," Mar. 2009, pp. 1-4 (+ cover).

IBM, "Power ISA—V2.07B," Apr. 2015, pp. 1-1527.

IBM, "z/Architecture—Principles of Operation," IBM Publication No. SA22-7832-10, 11$^{th}$ Edition, Mar. 2015, pp. 1-1732.

Kamenski, Jaime, "MVS Update," Sep. 2001, pp. 1-72.

Mel, Peter and Tim Grance, "The NIST Definition of Cloud Computing," National Institute of Standards and Technology, Information Technology Laboratory, Special Publication 800-145, Sep. 2011, pp. 1-7.

Paulino, Nuno et al., "Generation of Customized Accelerators for Loop Pipelining of Binary Instruction Traces," IEEE Transactions on Very Large Scale Integration (VLSI) Systems, Jul. 2016, pp. 1-14.

Seyfarth, Ray, "Branching and Looping," Jun. 2012, pp. 1-25.

Shi, Guangyu et al., "Accelerating Search and Recognition Workloads with SSE 4.2 String and Test Processing Instructions," 2011 IEEE International Symposium on Performance Analysis of Systems and Software (ISPASS), Apr. 2011, pp. 145-153.

Tendler, J.M. et al., "POWER4 System Microarchitecture," IBM J. Res. & Dev. vol. 46, No. 1, Jan. 2002, pp. 5-25.

Wheatcroft, A. et al., "Conversion of Character String Data to Bit String Data," IPCOM000094537, Nov. 1975, pp. 1-2 (+ cover).

IBM, "z/Architecture Principles of Operation," SA22-7832-10, Mar. 2015, pp. III-X65.

IA-32 Intel Architecture Software Developer's Manual, Sep. 2005, vol. 2A, 19 pages, [retrieved frm the internet on Sep. 20, 2018], retrieved from URL www.scs.stanford.edu/05au-cs240c/lab/ia32/IA32-2A.pdf (year: 2005).

"Character", Oct. 12, 2007, techterms.com, 2 pages, [retrieved from the internet on Feb. 22, 2019], retrieved from URL <techterms.com/definition/character>.

Gschwind, Michael K., "Selected Processing Based on Expected Value of Selected Character," U.S. Appl. No. 16/401,134, filed May 2, 2019, pp. 1-95.

List of IBM Patents or Patent Applications Treated as Related, May 2, 2019, pp. 1-2.

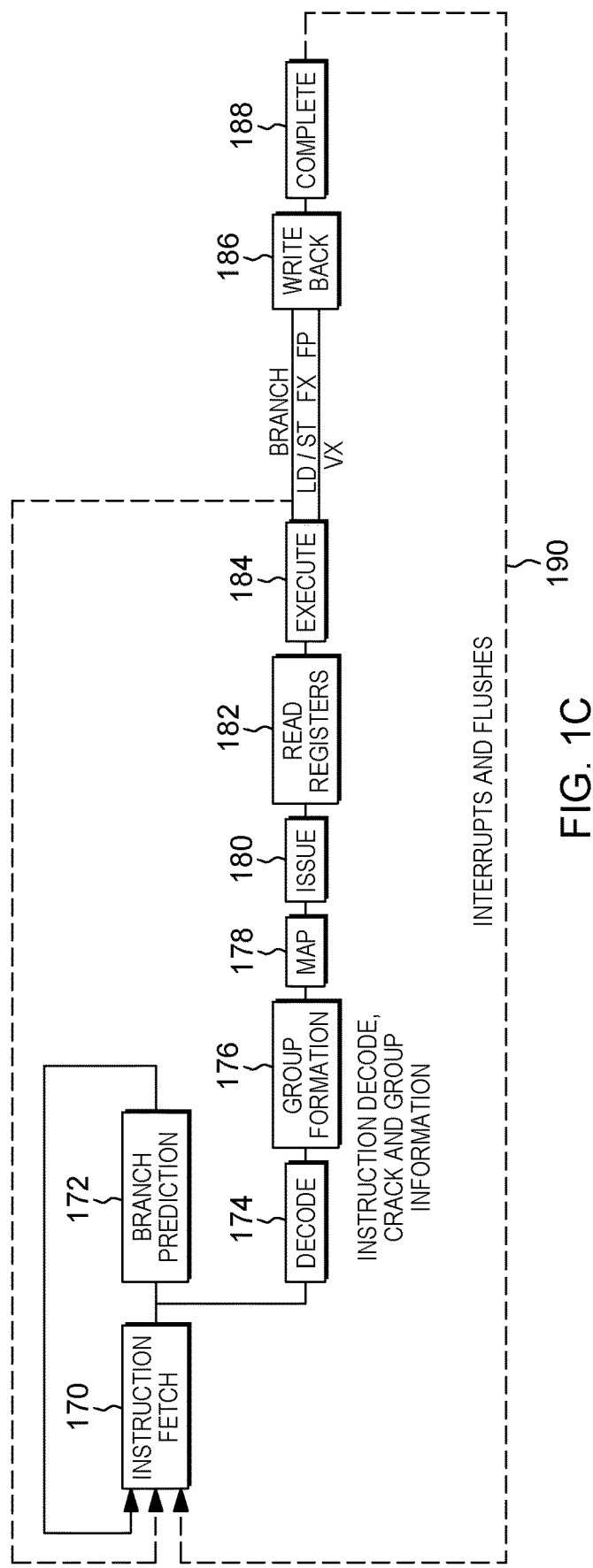

VECTOR STORE WITH LENGTH

COMPARE LOGICAL STRING

OBTAIN AN INSTRUCTION TO BE PROCESSED ~1400

THE INSTRUCTION DEFINED TO BE A LOOPING INSTRUCTION ~1402

A LOOP IS CONFIGURED TO REPEAT A PLURALITY OF TIMES TO PERFORM AN OPERATION ON UP TO A DEFINED NUMBER OF UNITS OF DATA ~1404

PROCESS THE INSTRUCTION ~1410

DETERMINE WHETHER AN OBTAINED SELECTED CHARACTER IS AN EXPECTED SELECTED CHARACTER ~1412

USE, BASED ON THE OBTAINED SELECTED CHARACTER BEING THE EXPECTED SELECTED CHARACTER, AN EXECUTION PROCESS THAT INCLUDES A SEQUENCE OF OPERATIONS TO PERFORM THE OPERATION ~1414

THE SEQUENCE OF OPERATIONS REPLACING THE LOOP AND PROVIDING A NON-LOOPING SEQUENCE TO PERFORM THE OPERATION ON UP TO THE DEFINED NUMBER OF UNITS OF DATA ~1416

THE SEQUENCE OF OPERATIONS BEING CONFIGURED TO REPEAT ONE OR MORE TIMES AND TO TERMINATE BASED ON THE SELECTED CHARACTER ~1418

CHOOSE, BASED ON THE OBTAINED SELECTED CHARACTER BEING DIFFERENT THAN THE EXPECTED SELECTED CHARACTER, AN ALTERNATE EXECUTION PROCESS ~1420

THE INSTRUCTION IS A MOVE STRING INSTRUCTION ~1422

THE INSTRUCTION IS A COMPARE STRING INSTRUCTION ~1424

THE INSTRUCTION IS A SEARCH STRING INSTRUCTION ~1426

FIG. 14A

SELECTING PROCESSING BASED ON EXPECTED VALUE OF SELECTED CHARACTER

This application is a continuation of co-pending U.S. patent application Ser. No. 16/212,952, filed Dec. 7, 2018, entitled "SELECTING PROCESSING BASED ON EXPECTED VALUE OF SELECTED CHARACTER," which is a continuation of co-pending U.S. patent application Ser. No. 15/449,219, filed Mar. 3, 2017, entitled "SELECTING PROCESSING BASED ON EXPECTED VALUE OF SELECTED CHARACTER," each of which is hereby incorporated herein by reference in its entirety.

BACKGROUND

One or more aspects relate, in general, to processing within a computing environment, and in particular, to facilitating such processing.

Various string operations, such as C string operations, have variable length termination semantics, regardless of the selected operating system. Therefore, traditional string operations that expect a known string length are not a good match for implementing such string operations.

To accelerate processing of strings and other sequences, the z/Architecture offered by International Business Machines Corporation, Armonk, N.Y., introduced instructions with a defined terminator. Such instructions include, for instance, a Move String (MVST) instruction and a Compare Logical String (CLST) instruction. These instructions are implemented in hardware or microcode.

SUMMARY

Shortcomings of the prior art are overcome and additional advantages are provided through the provision of a computer program product for facilitating processing within a computing environment. The computer program product comprises a storage medium readable by a processing circuit and storing instructions for performing a method. The method includes, for instance, obtaining an instruction to be processed. The instruction is defined to be a looping instruction, wherein a loop is configured to repeat a plurality of times to perform an operation on up to a defined number of units of data. The instruction is processed, and the processing includes determining whether an obtained selected character is an expected selected character. Based on the obtained selected character being the expected selected character, an execution process is used that includes a sequence of operations to perform the operation, the sequence of operations replacing the loop and providing a non-looping sequence to perform the operation on up to the defined number of units of data. The sequence of operations is configured to repeat one or more times and to terminate based on the obtained selected character. Based on the obtained selected character being different than the expected selected character, an alternate execution process is chosen.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 1C depicts further details of one example of an instruction execution pipeline used in accordance with one or more aspects of the present invention;

FIGS. 14A-14B depict one example of an aspect of facilitating processing within a computing environment, in accordance with an aspect of the present invention;

DETAILED DESCRIPTION

In accordance with one or more aspects, string processing is facilitated by providing implementations of one or more string operations that provide flexibility and improve performance. For instance, instead of implementing a string operation in hardware or microcode (including Millicode or other such hardware level code), the string operation is implemented inline in straight-line code using instruction cracking in which a sequence of internal operations is used to perform the string operation of the instruction. This sequence of operations performs the string operation on a defined number of characters concurrently (e.g., in parallel) absent a loop to process the defined number of characters.

Examples of instructions implemented, in accordance with aspects of the present invention, include a Move String (MVST) instruction, a Compare Logical String (CLST) instruction, and a Search String (SRST) instruction, each of which is described below. Other instructions may also be implemented in accordance with one or more aspects of the present invention.

One embodiment of a computing environment to incorporate and use one or more aspects of the present invention is described with reference to FIG. 1A. In one example, the computing environment is based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE is a registered trademark of International Business Machines Corporation, Armonk, N.Y., USA.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures. Other examples also exist.

Figure 1A:
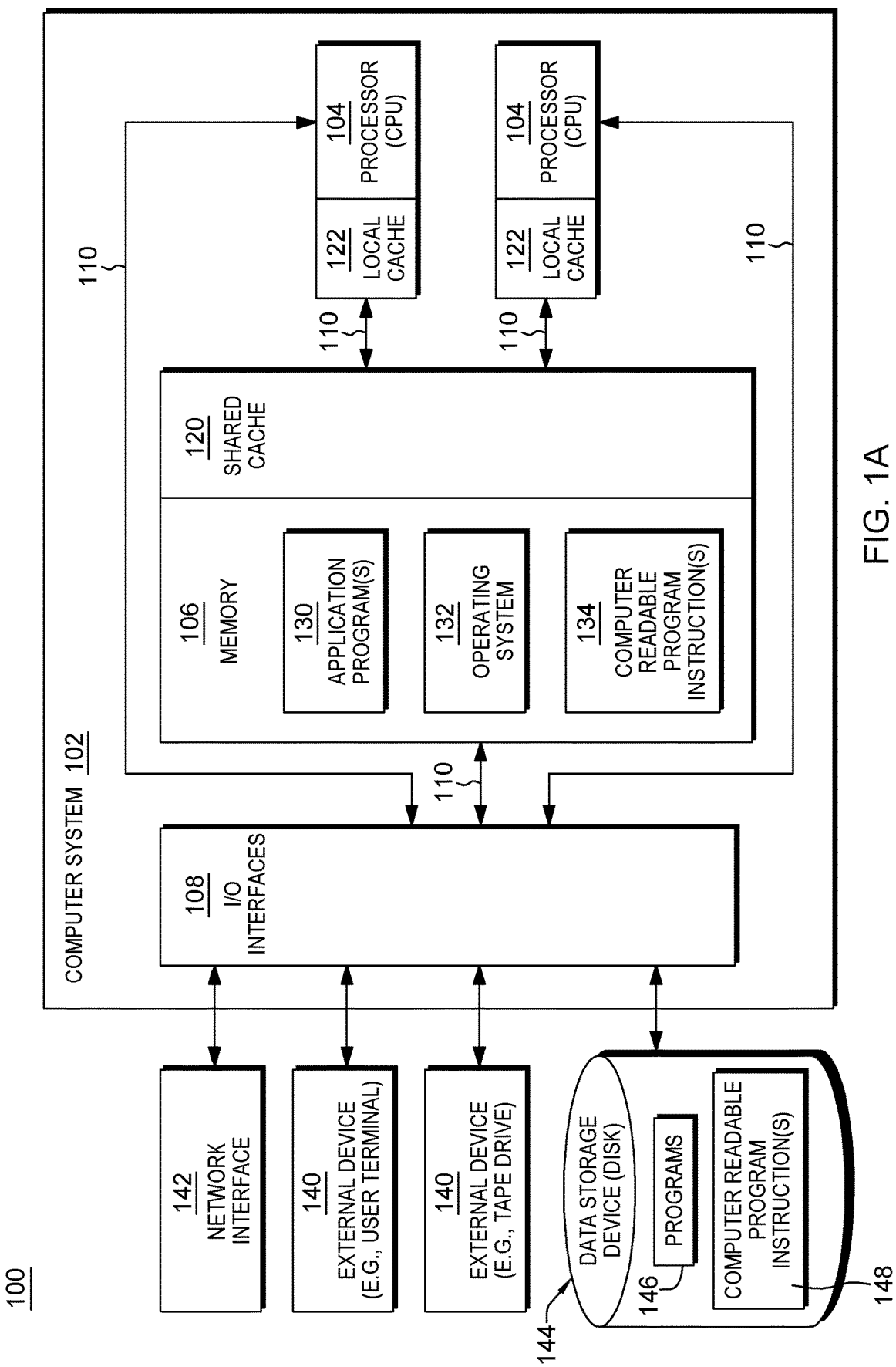
FIG. 1A depicts one example of a computing environment to incorporate and use one or more aspects of the present invention.

As shown in FIG. 1A, a computing environment 100 includes, for instance, a computer system 102 shown, e.g., in the form of a general-purpose computing device. Computer system 102 may include, but is not limited to, one or more processors or processing units 104 (e.g., central processing units (CPUs)), a memory 106 (referred to as main memory or storage, as examples), and one or more input/output (I/O) interfaces 108, coupled to one another via one or more buses and/or other connections 110.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 120, such as a shared cache, which may be coupled to local caches 122 of processors 104. Further, memory 106 may include one or more programs or applications 130, an operating system 132, and one or more computer readable program instructions 134. Computer readable program instructions 134 may be configured to carry out functions of embodiments of aspects of the invention.

Computer system 102 may also communicate via, e.g., I/O interfaces 108 with one or more external devices 140, one or more network interfaces 142, and/or one or more data storage devices 144. Example external devices include a user terminal, a tape drive, a pointing device, a display, etc. Network interface 142 enables computer system 102 to communicate with one or more networks, such as a local area network (LAN), a general wide area network (WAN), and/or a public network (e.g., the Internet), providing communication with other computing devices or systems.

Data storage device 144 may store one or more programs 146, one or more computer readable program instructions 148, and/or data, etc. The computer readable program instructions may be configured to carry out functions of embodiments of aspects of the invention.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1B:
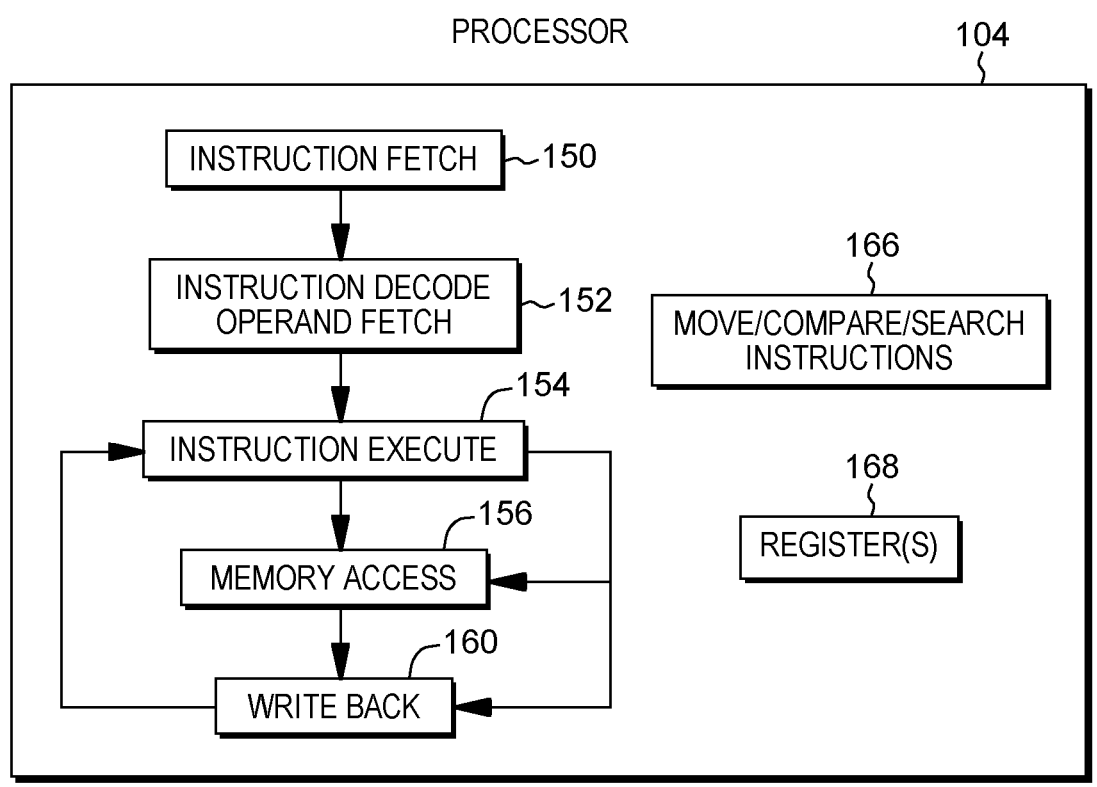
FIG. 1B depicts further details of the processor of FIG. 1A, in accordance with one or more aspects of the present invention.

Further details regarding one example of processor 104 are described with reference to FIG. 1B. Processor 104 includes a plurality of functional components used to execute instructions. These functional components include, for instance, an instruction fetch component 150 to fetch instructions to be executed; an instruction decode unit 152 to decode the fetched instructions and to obtain operands of the decoded instructions; instruction execution components 154 to execute the decoded instructions; a memory access component 156 to access memory for instruction execution, if necessary; and a write back component 160 to provide the results of the executed instructions. One or more of these components may, in accordance with an aspect of the present invention, be used to execute one or more string operations and/or instructions, including, but not limited to, move string, compare strings, and/or search string instructions 166, described further below.

Processor 104 also includes, in one embodiment, one or more registers 168 to be used by one or more of the functional components. Processor 104 may include additional, fewer and/or other components than the examples provided herein.

Further details regarding an execution pipeline of processor 104 are described with reference to FIG. 1C. Although various processing stages of the pipeline are depicted and described herein, it will be understood that additional, fewer and/or other stages may be used without departing from the spirit of aspects of the invention.

Referring to FIG. 1C, in one embodiment, an instruction is fetched 170 from an instruction queue. Branch prediction 172 may be performed and/or decoding 174 of the instruction. The decoded instruction may be added to a group of instructions 176 to be processed together. During the decoding, in accordance with an aspect of the present invention, instruction cracking may be performed. During instruction cracking, the instruction is decoded into a sequence of operations, such as a plurality of internal micro-operations, used to perform the operation of the fetched instruction, which is, e.g., an architected instruction defined in e.g., an Instruction Set Architecture (ISA). In one embodiment, the sequence of operations is configured to operate on a plurality of units of data (e.g., bytes) concurrently without looping, and thus, is referred to as a non-looping sequence, while the architected instruction is configured to be looping to operate on the plurality of units of data. As an example, an architected load and update instruction used to load one register and increment an index register may be cracked into a load operation and a separate add operation. If cracking is performed, the internal operations are grouped together, if possible.

The grouped instructions are provided to a mapper 178 that determines any dependencies, assigns resources and dispatches the group of instructions/operations to the appropriate issue queues. There are one or more issue queues for the different types of execution units, including, as examples, branch, load/store, floating point, fixed point, vector, etc. During an issue stage 180, an instruction/operation is issued to the appropriate execution unit. Any registers are read 182 to retrieve its sources, and the instruction/operation executes during an execute stage 184. As indicated, the execution may be for a branch, a load (LD) or a store (ST), a fixed point operation (FX), a floating point operation (FP), or a vector operation (VX), as examples. Any results are written to the appropriate register(s) during a writeback stage 186. Subsequently, the instruction completes 188. If there is an interruption or flush 190, processing may return to instruction fetch 170.

Figure 2A:
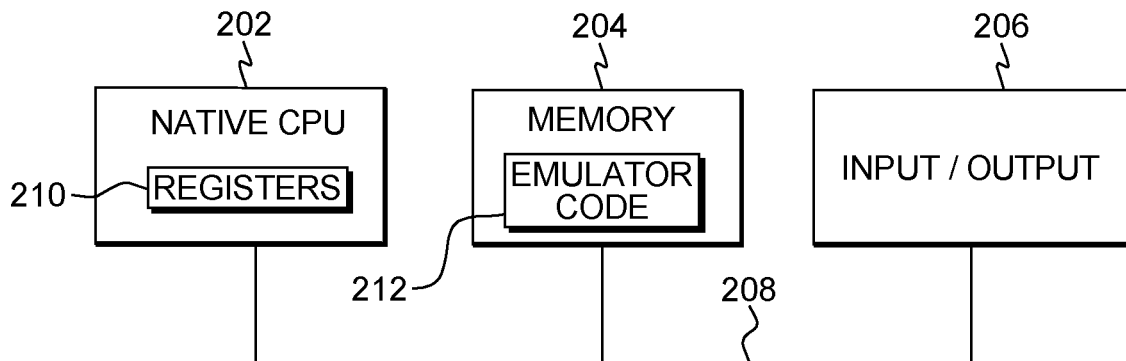
FIG. 2A depicts another example of a computing environment to incorporate and use one or more aspects of the present invention.

Another embodiment of a computing environment to incorporate and use one or more aspects is described with reference to FIG. 2A. In this example, a computing environment 200 includes, for instance, a native central processing unit (CPU) 202, a memory 204, and one or more input/output devices and/or interfaces 206 coupled to one another via, for example, one or more buses 208 and/or other connections. As examples, computing environment 200 may include a PowerPC processor or a pSeries server offered by International Business Machines Corporation, Armonk, N.Y.; and/or other machines based on architectures offered by International Business Machines Corporation, Intel, or other companies.

Native central processing unit 202 includes one or more native registers 210, such as one or more general purpose registers and/or one or more special purpose registers used during processing within the environment. These registers include information that represents the state of the environment at any particular point in time.

Moreover, native central processing unit 202 executes instructions and code that are stored in memory 204. In one particular example, the central processing unit executes emulator code 212 stored in memory 204. This code enables the computing environment configured in one architecture to emulate another architecture. For instance, emulator code 212 allows machines based on architectures other than the z/Architecture, such as PowerPC processors, pSeries servers, or other servers or processors, to emulate the z/Architecture and to execute software and instructions developed based on the z/Architecture.

Figure 2B:
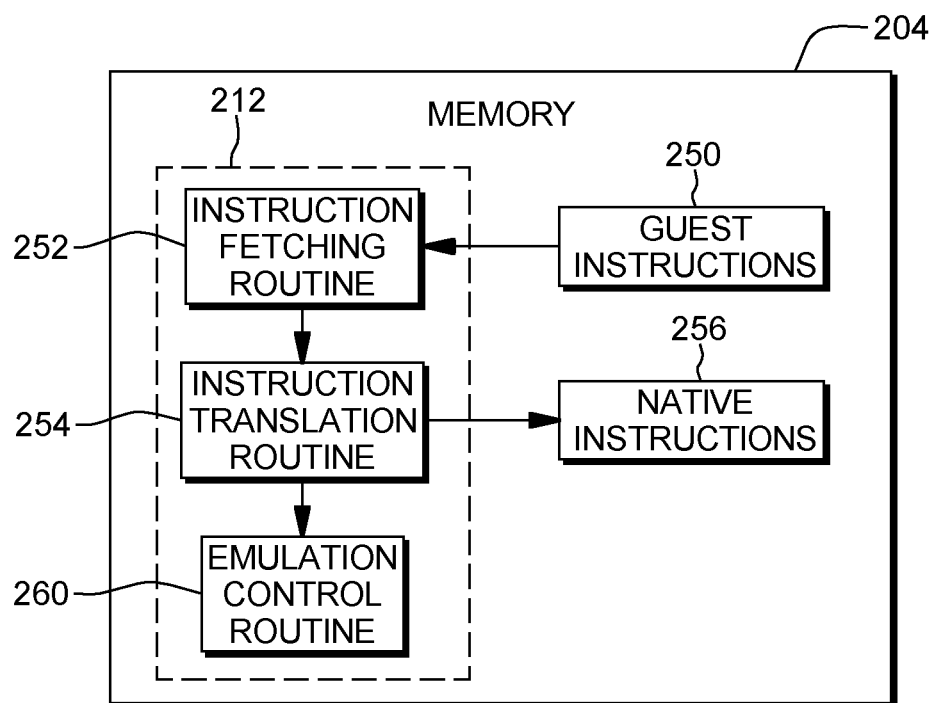
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a z/Architecture processor, but instead, are being emulated on native CPU 202, which may be, for example, an Intel processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode or Millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

A guest instruction 250 that is obtained, translated and executed is, for instance, a move string instruction, a compare string instruction or a search string instruction, examples of which are described herein. The instruction, which is of one architecture (e.g., the z/Architecture), is fetched from memory, translated and represented as a sequence of native instructions 256 of another architecture (e.g., PowerPC, pSeries, Intel, etc.). These native instructions are then executed.

As indicated above, one instruction implemented in accordance with an aspect of the present invention, is a Move String (MVST) instruction, an example of which is defined in the z/Architecture. The Move String instruction is used to move a second operand designated by general register $R_2$ to a first operand location designated by general register $R_1$. The movement is made left to right until an ending character specified in general register 0 has been moved or a CPU-determined number of bytes have been moved. The condition code is set to 1 if the ending character was moved or a 3 if a CPU-determined number of bytes were moved.

Figure 3:
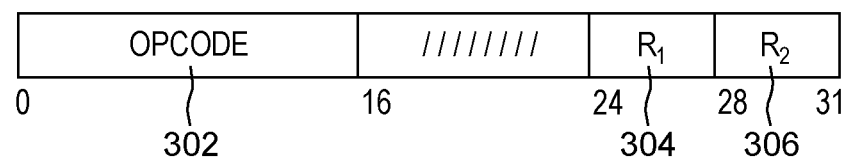
FIG. 3 depicts one example of a Move String instruction used in accordance with an aspect of the present invention.

Referring to FIG. 3, one example of a Move String instruction 300 defined in accordance with the z/Architecture is described. This architected version of the instruction includes, for instance, an operation code (opcode) field 302 that includes an opcode to specify a move string operation, a first register field ($R_1$) 304 and a second register field ($R_2$) 306. In one embodiment, the fields of the instruction are separate and independent from one another. However, in another embodiment, more than one field may be combined. Further, a subscript number associated with a field of the instruction denotes the operand to which the field applies. For instance, any field having a subscript 1 is associated with a first operand, and any field having a subscript 2 is associated with a second operand.

In one example operation of the Move String instruction, all or part of the second operand is placed in the first operand location. The operation proceeds until the end of the second operand is reached or a CPU-determined number of bytes have been moved, whichever occurs first. The CPU-determined number is at least one, in one example. The result is indicated in the condition code.

The location of the leftmost byte of the first operand and the second operand is designated by the contents of general registers $R_1$ and $R_2$, respectively.

The handling of the addresses in general registers $R_1$ and $R_2$ is dependent on the addressing mode. In the 24-bit addressing mode, the contents of bit positions 40-63 of general registers $R_1$ and $R_2$ constitute the address, and the contents of bit positions 0-39 are ignored. In the 31-bit addressing mode, the contents of bit positions 33-63 of the registers constitute the address, and the contents of bit positions 0-32 are ignored. In the 64-bit addressing mode, the contents of bit positions 0-63 constitute the address.

The end of the second operand is indicated by an ending character in the last byte position of the operand. The ending character to be used to determine the end of the second operand is specified in bit positions 56-63 of general register 0. Bit positions 32-55 of general register 0 are reserved for possible further extensions and are to contain zeros; otherwise, a specification exception is recognized, in one example.

The operation proceeds left to right and ends as soon as the second operand ending character has been moved or a CPU-determined number of second operand bytes have been moved, whichever occurs first. The CPU-determined number is at least one, in one example. When the ending character is in the first byte position of the second operand, only the ending character is moved. When the ending character has been moved, condition code 1 is set. When a CPU-determined number of second operand bytes not including an ending character have been moved, condition code 3 is set. Destructive overlap is not recognized. If the second operand is used as a source after it has been used as a destination, the results are unpredictable.

When condition code 1 is set, it indicates the entire second operand has been moved, and the address of the ending character in the first operand is placed in general register $R_1$, and the contents of general register $R_2$ remain unchanged. When condition code 3 is set, it indicates a CPU-determined number of bytes have been moved, and the address of the next byte to be processed in the first and second operands is placed in general registers $R_1$ and $R_2$, respectively. Whenever an address is placed in a general register, bits 32-39 of the register, in the 24-bit addressing mode, or bit 32, in the 31-bit addressing mode, are set to zeros. Bits 0-31 of the $R_1$ and $R_2$ registers remain unchanged in the 24-bit or 31-bit mode.

The amount of processing that results in the setting of condition code 3 is determined by the CPU on the basis of improving system performance, and it may be a different amount each time the instruction is executed.

Access exceptions for the first and second operands are recognized, e.g., for that portion of the operand that is necessarily used in the operation.

Figure 4A:
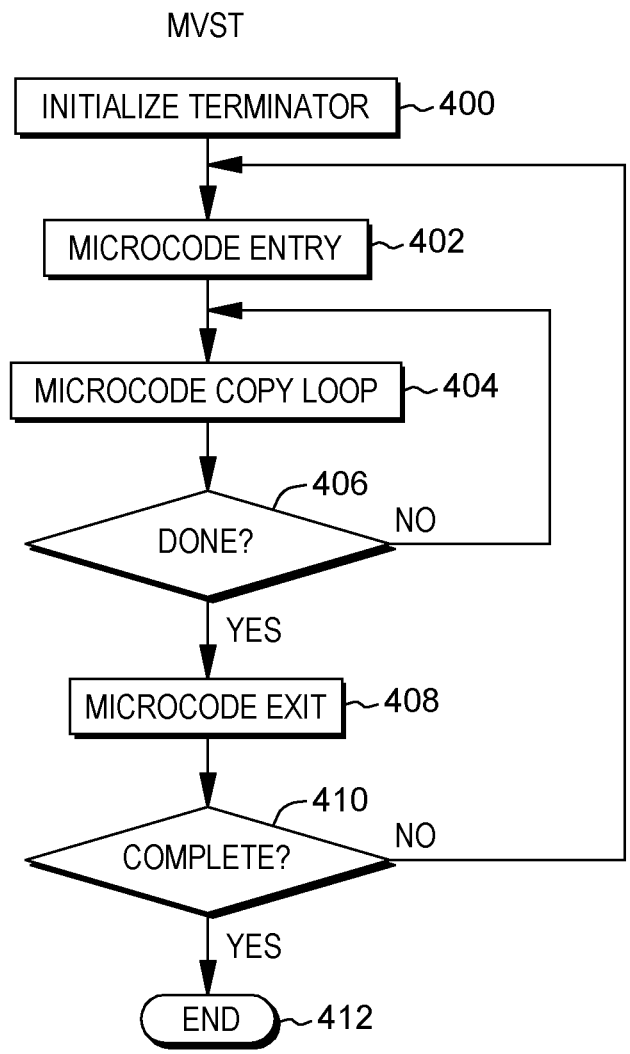
FIG. 4A depicts one implementation of the Move String instruction of FIG. 3.

One implementation of the Move String instruction uses microcode, which includes an expensive entry into and exit out of microcode processing. This is shown in FIG. 4A. Also shown in FIG. 4A is additional processing wrapped around the instruction implementation, including, for instance, an initialization step (e.g., STEP 400) and a completion check (e.g., INQUIRY 410), described below.

As depicted in FIG. 4A, in one implementation, a terminator (e.g., a termination character) is initialized, STEP 400. For instance, a zero may be set as a termination character, such that when zero is encountered in the string being moved, it indicates the end of the string being processed. Other values may also be used in other implementations.

The instruction begins processing, in which microcode processing is entered, STEP 402. This includes, for instance, performing an entry operation, setting up internal registers, and/or performing some bookkeeping related to setting up the registers, etc. A MVST copy loop begins, STEP 404. This loop is performed in microcode and includes copying each of the characters of the string, as described above. For instance, from left to right, each character is copied. After each character is copied, a determination is made as to whether all of the characters of the string have been copied or whether a CPU-determined number of characters have been copied, INQUIRY 406. If copying is to continue, then processing continues with STEP 404. Otherwise, microcode processing is exited, STEP 408, terminating instruction execution. Again, this includes, for instance, performing an exit operation, managing one or more registers, and/or performing various bookkeeping tasks. Thus, there is a cost associated with the microcode entry and exit processing.

Thereafter, a check loop (separate from MVST processing) begins in which a determination is made as to whether the entire string has been copied or if additional characters are to be copied, INQUIRY 410. If copying is to continue, then microcode is to be entered again, STEP 402, and copying continues, STEP 404. If copying is complete, then the check loop ends, STEP 412.

In accordance with an aspect of the present invention, in another implementation of MVST, the microcode entry and exit processing is avoided, and the MVST loop (i.e., the configured microcode copy loop performing the move operation) of the above-described processing is eliminated. Instead, the MVST copy loop is replaced with a cracked or expanded sequence of operations that copy up to a predetermined amount of data, such as a predefined number of bytes (e.g., 16 bytes) without looping (referred to herein as concurrently). Thus, this implementation of MVST is referred to herein as a non-loop configuration (or non-loop for convenience). This non-loop version of MVST processing, along with the additional initialization and completion check associated with MVST processing, is described further with reference to FIG. 4B.

In one example, the expanded sequence of operations is provided (e.g., generated) by an instruction decode unit and executed by one or more execution units. In one embodiment, the expansion is to straight-line (i.e., non-looping) code, corresponding to the MVST copy loop, that processes up to a predetermined amount of data (e.g. a defined number of units), such as, for instance, 16 bytes per expanded MVST. Consistent with the architected definition of MVST, subsequent to performing the expanded sequence of instructions, a check is made of the condition code and a loop may then be performed (e.g., corresponding to the check loop) until all the bytes of the string have been processed and the string terminator has been found. However, unlike the architected version, the MVST copy loop is not performed. Further, in accordance with an aspect of the present invention, the sequence of operations does not load past a specified memory boundary, such as a page or cache line boundary, as examples. This facilitates processing and improves system performance by eliminating checks for the specified boundary and processing associated therewith. This is further described below.

Figure 4B:
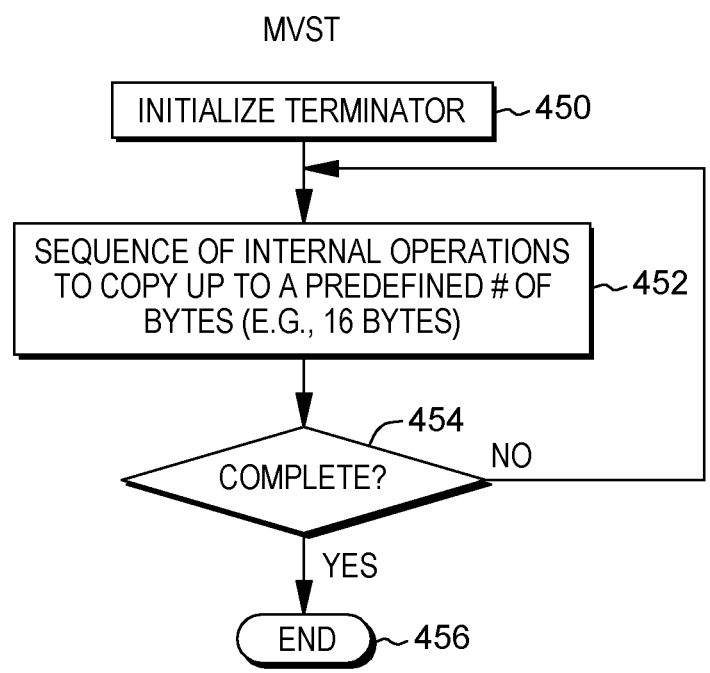
FIG. 4B depicts another implementation of the Move String instruction of FIG. 3, in accordance with an aspect of the present invention.

Referring to FIG. 4B, in one embodiment, a terminator is initialized, STEP 450. Additionally, a sequence of operations corresponding to the MVST instruction is provided by an instruction decode unit and executed via one or more execution units to perform the copying, STEP 452. This copying is performed without entering or exiting microcode processing. The sequence of operations copies up to a predetermined amount of data (e.g., a predefined number of bytes (e.g., 16 bytes)) without looping in the copy loop. For instance, in one implementation, vector units are used to copy up to 16 bytes concurrently. The predetermined amount of data includes bytes of the string up to and including the termination character, assuming the string is less than a defined number of bytes, e.g., 16; a defined number of bytes (e.g., 16); or up to a specified memory boundary, such as a page boundary or a cache line boundary, as examples.

Subsequent to performing the non-loop sequence of operations, a determination is made as to whether the copying is complete; i.e., whether there are more than the defined number (e.g., 16) of bytes of data to be copied, INQUIRY 454. If the copying is not complete, then the check loop is entered and processing continues, STEP 452. Otherwise, processing ends, STEP 456.

In a further example, the modified, non-loop implementation of the Move String instruction is used when the string includes a selected termination character, such as zero; otherwise, the architected microcode implementation is used. This is described further with reference to FIG. 4C.

Figure 4C:
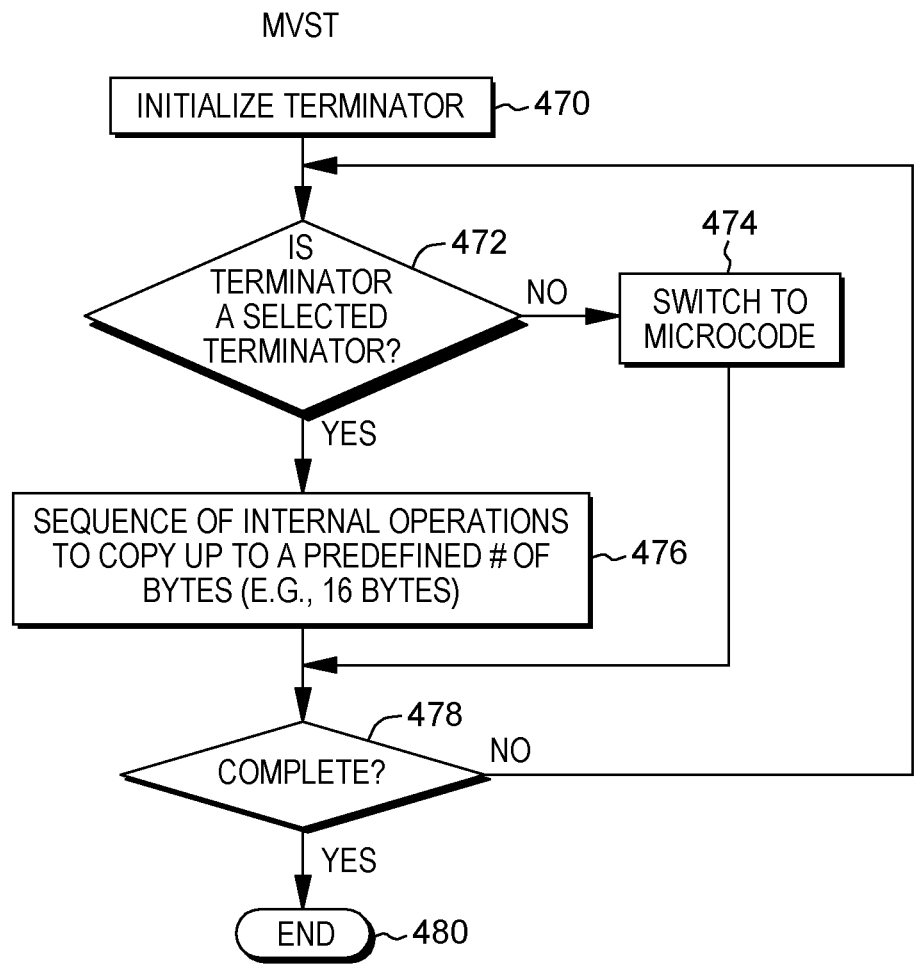
FIG. 4C depicts another implementation of the Move String instruction of FIG. 3, in accordance with an aspect of the present invention.

As shown in FIG. 4C, a terminator is initialized, STEP 470, and a determination is made as to whether the terminator is a specific value, such as 0, INQUIRY 472. If the initialized terminator is not the selected terminator value (e.g., 0), then the microcode implementation is used, in one embodiment, STEP 474. For example, an internal trap to microcode is performed to treat cases of a non-zero (or non-selected) terminator. The internal trap is performed using, for instance, a CGIT <R0>, 0, NE instruction, described below. Otherwise, the modified, non-loop implementation that uses a sequence of internal operations, instead of entering/exiting microcode, is used. For instance, a sequence of operations is provided using a decode unit and executed by one or more execution units to perform the copying, STEP 476. This is accomplished without entering microcode processing. The sequence of operations copies up to a predetermined amount of data (e.g., a predefined number of bytes (e.g., 16 bytes)) without looping in the copy loop. The predetermined amount of data includes bytes of the string up to and including the termination character, assuming the string is less than a defined number of bytes, e.g., 16; a defined number of bytes (e.g., 16); or up to a specified boundary, such as a page boundary or a cache line boundary, as examples.

Subsequent to performing the non-loop sequence of operations or the microcode, a determination is made as to whether the copying is complete; i.e., whether there are more than the defined number (e.g., 16) of bytes of data to be copied, INQUIRY 478. If the copying is not complete, then the check loop is entered and processing continues, STEP 472. Otherwise, processing ends, STEP 480.

As indicated above, in one example, to switch to microcode, a CGIT (Compare and Generate Internal Trap) internal operation (iop) is used. CGIT tests whether general register 0 corresponds to the value, e.g., 0, and raises an "internal trap" to microcode. In accordance with one definition, an internal trap flushes all subsequent internal operations and instructions after the CGIT from the pipeline and commences execution at a point determined by either a label, or computed by logic responsive to the instruction opcode corresponding to the CGIT having been executed. In one or more embodiments, the CGIT iop takes operands specifying the operands to be compared and a comparison condition. In other embodiments, an iop includes implicit values for these operands. In yet other embodiments, the test is performed by ancillary logic in lieu of an explicit opcode. In one embodiment, iops and ancillary logic advantageously can execute in parallel and out-of-order with respect to iops corresponding to sequence 476 and to instructions surrounding the MVST instruction.

One example of a sequence of internal operations that may be used to perform the MVST copy is described below. The decode unit generates or selects this sequence of operations when the non-loop version of the MVST instruction is to be executed. In the below internal operations, <R0>, <R1>, and <R2> refer to the architected registers r0, r1, r2, or their renamed physical variants; eR1, eR2 refer to non-loop internal general purpose registers (or their physical counterparts) used by expanded code sequences; and eVR1, eVR2 refer to non-loop internal vector registers (or their physical counterparts) used by expanded code sequences. The suffix modifiedcc indicates that the treatment of the condition code for the suffixed operation is different from the architected version (the architected version of the operation corresponding to the architected instruction) of how the condition code is handled. The suffix nocc refers to no condition code in that the condition code is not set for the suffixed operation as defined in the architected version (the architected version of the operation corresponding to the architected instruction). The suffix nocc_cond indicates that the operation associated therewith is performed for a particular condition, and that the condition code is not set, which again is different for the architected version of the instruction to which this pertains.

One example sequence of operations for MVST includes:
VLBB <eVR1>, <R1>, <boundary>
Load into eVR1 a number of bytes (e.g., 16) up to a selected boundary, e.g., page or cache line boundary
VFENE_modifiedcc <eVR2>, <eVR1>, <eVR1>
Find terminator condition \0
LCBB_nocc <eR1>, <R1>, <boundary>
Compute number of bytes loaded by VLBB
MIN_nocc <eR2>, <eR1>, <eVR2>
Determine the minimum of the loaded bytes (eR1) or the position of the termination character (eVR2) to determine the total number of bytes (eR2) to transfer
VSTL_nocc <eVR1>, <R2>, L=<eR2>
Store the computed number of bytes (i.e., the content of those bytes) in eR2 from eVR1 to the address specified by R2.
A_nocc <R1>, <eR2>
Add the number (i.e., count) of stored bytes (eR2) to register R1
A_nocc_cond <R2>, <eR2>
Add the number (i.e., count) of stored bytes (eR2) to register R2, if the cc flag value is 3. This instruction adds the second operand register to the first operand register, if the condition code is 3. Thus, by using the Add operations, when condition code 3 is set, the address of the next byte to be processed in the first and second operands is placed in general registers R1 and R2, respectively. (Other embodiments and condition code handling are possible, e.g., using a predicated instruction, a conditional move of an unconditional add into a temporary register, etc.)

In one or more other embodiments, different internal operations may be used, and/or the internal operations may be reordered. In one or more embodiments, multiple internal operations may be combined, for example, the load count to boundary operation and a subsequent minimum operation may be implemented as a single internal operation. Other possibilities also exist.

As examples, the operations of the non-loop sequence of operations may have different opcodes than their corresponding architected instructions, or they may have the same opcodes, but a flag is set indicating that the non-loop versions are to be processed. Other examples are also possible.

At least some of the operations described above are vector operations, which are part of a vector facility. The vector facility provides, for instance, fixed size vectors ranging from one to sixteen elements. Each vector includes data which is operated on by vector operations/instructions. In one embodiment, if a vector is made up of multiple elements, then each element is processed in parallel with the other elements. Instruction completion does not occur until processing of all of the elements is complete.

Vector data appears in storage, for instance, in the same left-to-right sequence as other data formats. Bits of a data format that are numbered 0-7 constitute the byte in the leftmost (lowest-numbered) byte location in storage, bits 8-15 form the byte in the next sequential location, and so on. In a further example, the vector data may appear in storage in another sequence, such as right-to-left.

Further details regarding various of the vector operations are provided below. Initially, architected definitions of the instructions corresponding to the operations are described, e.g., as defined in the z/Architecture. Then, modifications to the architected definitions, if any, implemented by the non-loop sequence of operations for one or more aspects of the present invention are described.

At least some of the architected vector instructions described herein and provided with the vector facility include a field of specified bits. This field, referred to as a register extension bit or RXB, includes the most significant bit for each of the vector register designated operands. Bits for register designations not specified by the instruction are to be reserved and set to zero.

In one example, the RXB field includes four bits (e.g., bits 0-3), and the bits are defined as follows:
0—Most significant bit for the first vector register designation of the instruction.
1—Most significant bit for the second vector register designation of the instruction, if any.
2—Most significant bit for the third vector register designation of the instruction, if any.
3—Most significant bit for the fourth vector register designation of the instruction, if any.

Each bit is set to zero or one by, for instance, the assembler depending on the register number. For instance, for registers 0-15, the bit is set to 0, for registers 16-31, the bit is set to 1, etc.

In one embodiment, each RXB bit is an extension bit for a particular location in an instruction that includes one or more vector registers. For instance, in one or more vector instructions, bit 0 of RXB in an extension bit for location 8-11, which is assigned to e.g., $V_1$; bit 1 of RXB is an extension bit for location 12-15, which is assigned to e.g., $V_2$; and so forth.

In a further embodiment, the RXB field includes additional bits, and more than one bit is used as an extension for each vector or location.

Each of the above operations will now be described. Initially, the architected instructions are described, and then any modifications for the corresponding operations are described.

Figure 5:
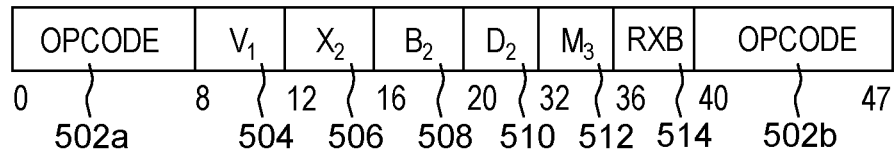
FIG. 5 depicts one example of a Vector Load to Block Boundary instruction used in accordance with an aspect of the present invention.

One example of a Vector Load to Block Boundary (VLBB) instruction is described with reference to FIG. 5. In one example, an architected version of the Vector Load To Block Boundary instruction 500 includes operation code (opcode) fields 502*a* (e.g., bits 0-7), 502*b* (e.g., bits 40-47) indicating a Vector Load to Block Boundary operation; a vector register field 504 (e.g., bits 8-11) used to designate a vector register ($V_1$); an index field ($X_2$) 506 (e.g., bits 12-15); a base field ($B_2$) 508 (e.g., bits 16-19); a displacement field ($D_2$) 510 (e.g., bits 20-31); a mask field ($M_3$) 512 (e.g., bits 32-35); and an RXB field 514 (e.g., bits 36-39). Each of the fields 504-514, in one example, is separate and independent from the opcode field(s). Further, in one embodiment, they are separate and independent from one another; however, in other embodiments, more than one field may be combined. Further information on the use of these fields is described below.

In one example, the vector ($V_1$) field, along with its corresponding extension bit specified by RXB, designates a vector register. In particular, for vector registers, the register containing the operand is specified using, for instance, a four-bit field of the register field with the addition of the register extension bit (RXB) as the most significant bit. For instance, if the four bit field is 0110 and the extension bit is 0, then the five bit field 00110 indicates register number 6.

In one example, the contents of general registers designated by the $X_2$ and $B_2$ fields are added to the contents of the $D_2$ field to form the second operand address. The displacement, $D_2$, for the Vector Load To Block Boundary instruction is treated as a 12 bit unsigned integer, in one example.

The $M_3$ field, in one embodiment, specifies a code that is used to signal the CPU as to the block boundary to load to. If a reserved value is specified, a specification exception is recognized. Example codes and corresponding values are as follows:

| Code | Boundary |
|------|----------|
| 0 | 64-Byte |
| 1 | 128-Byte |
| 2 | 256-Byte |
| 3 | 512-Byte |
| 4 | 1K-Byte |
| 5 | 2K-Byte |
| 6 | 4K-Byte |

In execution of one embodiment of the Vector Load To Block Boundary instruction, proceeding in one embodiment from left to right, the first operand (specified in the register designated by the $V_1$ field plus the extension bit) is loaded starting at the zero indexed byte element with bytes from the second operand. The second operand is a memory location designated by the second operand address (also referred to as a starting address). The loading starts from that memory location and continues to an ending address computed by the instruction (or processor). If a boundary condition is encountered, it is model-dependent on how the rest of the first operand is treated. Access exceptions are not recognized on bytes not loaded. In one example, bytes that are not loaded are unpredictable.

In one embodiment of the architected instruction, the starting address is determined by the index register value ($X_2$) plus a base register value ($B_2$) plus a displacement ($D_2$); however, in other embodiments, it is provided by a register value; an instruction address plus an instruction text specified offset; a register value plus displacement; or a register value plus index register value; as just some examples. Further, in one embodiment, the instruction does not include the RXB field. Instead, no extension is used or the extension is provided in another manner, such as from a control outside of the instruction, or provided as part of another field of the instruction.

In one embodiment of the VLBB operation (i.e., the non-loop configured version of the architected instruction), the starting address is provided by R1 instead of $X_2$, $B_2$, $D_2$, and eVR1 indicates the register to be loaded, instead of $V_1$. Further, $M_3$ is replaced by <boundary>. This operation loads into eVR1 a number of bytes starting at the address in R1 and ending when a termination character (e.g., 0) is loaded, a CPU-determined number of bytes is loaded, or, in accordance with an aspect of the present invention, when a specified boundary (e.g., a page or cache line boundary) is reached.

In one example, VLBB loads a full vector, or up to at most a specified (e.g., page) boundary (translation boundary) so as to avoid any exceptions if the terminator is between the designated start address and the page boundary, but the full vector length (e.g., 16 bytes) extends into the next page and satisfying a normal load would require loading from that next inaccessible page, which would lead to an address translation exception being raised that does not correspond to the specification of the MVST or other such instruction.

In another example, the boundary may be set to less than a page boundary, e.g., a cache line or cache block (subline), since crossing such boundaries is often associated with a performance penalty. Consequently, a first execution would load up to that point, and subsequent executions will be aligned relative to the source operand access, resulting in higher performance. (This is particularly true for longer strings where the benefit of a subsequent aligned access dwarfs the lower efficiency of performing a shorter access at the beginning).

In accordance with at least one embodiment, the boundary is dynamically chosen, e.g., based on a selected boundary predictor which is equipped to determine whether a boundary should be specified as a page boundary, a cache line, subline or other boundary, e.g., based on including, but not limited to, an observed operand length for a specific string operation (local predictor) or string lengths generally used in a system (global predictor), or the performance benefits observed from executing aligned vs. unaligned accesses relative to a specific boundary for source operands (again with either a local or global predictor). Other examples are also possible for dynamically choosing the boundary.

Figure 6A:
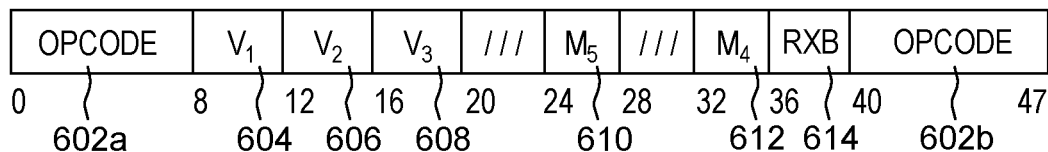
FIG. 6A depicts one example of a Vector Find Element Not Equal instruction used in accordance with an aspect of the present invention.

Another operation indicated above is VFENE (Vector Find Element Not Equal), which is used to find a termination character, such as a null terminator (e.g., 0). One example of an architected version of VFENE is described with reference to FIG. 6A. In one embodiment, this architected instruction is able to compare data of multiple vectors for inequality, as well as search a selected vector for a terminator, such as a null or zero element (e.g., the entire element is zero).

In one example, the Vector Find Element Not Equal instruction 600 includes opcode fields 602*a* (e.g., bits 0-7), 602*b* (e.g., bits 40-47) indicating a Vector Find Element Not Equal operation; a first vector register field 604 (e.g., bits 8-11) used to designate a first vector register ($V_1$); a second vector register field 606 (e.g., bits 12-15) used to designate a second vector register ($V_2$); a third vector register field 608 (e.g., bits 16-19) used to designate a third vector register ($V_3$); a first mask field ($M_5$) 610 (e.g., bits 24-27); a second mask field ($M_4$) 612 (e.g., bits 32-35); and an RXB field 614 (e.g., bits 36-39). Each of the fields 604-614, in one example, is separate and independent from the opcode field(s). Further, in one embodiment, they are separate and independent from one another; however, in other embodiments, more than one field may be combined. Further information on the use of these fields is described below.

The $M_4$ field having, for instance, four bits, 0-3, specifies an element size control in, for instance, bits 1-3. The element size control specifies the size of the elements in the vector register operands. In one example, the element size control can specify a byte, a halfword (e.g., 2 bytes) or a word (e.g., 4 bytes). For instance, a 0 indicates a byte; a 1 indicates a halfword; and a 2 indicates a word, a.k.a., fullword. If a reserved value is specified, a specification exception is recognized.

The $M_5$ field is, for instance, a four bit field, bits 0-3, including, for instance:

A zero search field (ZS, bit 2), which if one, each element of the second operand is also compared for equality with zero. (In a further example, it is each element of the third operand or another operand that is compared to zero.); and A condition code set field (CS, bit 3), which if zero, the condition code is not set and remains unchanged. If one, the condition code is set as specified below, as an example:

0—If the zero search bit is one, comparison detected a zero element in both operands in a lower indexed element than any unequal compares;

1—An element mismatch was detected and the element in the second operand is less than the element in the third operand;

2—An element mismatch was detected and the element in the second operand is greater than the element in the third operand; and 3—All elements compared equal, and if the zero search bit is one, no zero elements were found in the second operand (or, in another embodiment, other operands).

In execution of one embodiment of the architected Vector Find Element Not Equal instruction, proceeding in one embodiment from left to right, the elements of the second operand (included in the vector register specified by $V_2$ and its extension bit) are compared with the corresponding elements of the third operand (included in the vector register specified by the $V_3$ field plus its extension bit) and optionally with zero. If two elements are not equal, a byte index of the leftmost non-equal element is placed in a specified byte (e.g., byte 7) of the first operand (designated in the register specified by $V_1$ and its extension bit), and zeros are stored to all other bytes of the first operand.

In one example, the byte index of the element that is returned (e.g., stored in the specified byte) is the index of the first byte of the leftmost element that is unequal. For instance, if the element size is byte, then the index of the leftmost unequal element is returned (e.g., if there are 16 elements, 0-15, and element 6 is unequal, then byte index 6 is returned). Similarly, if the element size is halfword, and there are 8 elements, 0-7, and either byte 6 or 7 of element three is unequal, then byte index 6 is returned. Likewise, if the element size is fullword and there are four elements, 0-3, and one of bytes 4-7 of element one is unequal, byte index 4 is returned.

If the condition code set bit in the $M_5$ field is set to, for instance, one, the condition code is set to indicate which operand was greater, if any. That is, for instance, the binary integer equivalent of, for instance, a character in the second operand is compared to a binary integer equivalent of the unequal character in the third operand, and the condition code is set based on this comparison. If elements were equal, then a byte index equal to the vector size (in number of bytes, e.g., 16) is placed in the specified byte (e.g., byte 7) of the first operand and zeros are placed in all other byte locations. If the condition code set bit is one, a selected condition code (e.g., condition code 3) is set.

If the zero search bit is one in the $M_5$ field, each element in the second operand (or in other embodiments, the third operand or another operand) is also compared for equality with zero (a.k.a., null terminator, end of string, etc.). If a zero element is found in the second operand before any other element of the second operand is found to be unequal, the byte index of the first byte of the element found to be zero is stored in the specified byte (e.g., byte 7) of the first operand (e.g., in $V_1$ of the architected version). Zeros are stored in all other bytes and a selected condition code (e.g., condition code zero) is set.

In one embodiment, the comparison of the elements is performed in parallel. For instance, if the registers being compared are 16 bytes in length, then 16 bytes are compared in parallel. In other embodiments, the units of data may be other than bytes, and the number of compares in parallel corresponds to the unit size. Further, in another embodiment, the direction of the vectors, left-to-right or right-to-left, is provided at runtime. For instance, the instruction accesses a register, status control or other entity that indicates the direction of processing as either left-to-right or right-to-left, as examples. In one embodiment, this direction control is not encoded as part of the instruction, but provided to the instruction at runtime.

In a further embodiment, the instruction does not include the RXB field. Instead, no extension is used or the extension is provided in another manner, such as from a control outside of the instruction, or provided as part of another field of the instruction.

In accordance with an aspect of the present invention, the version of the architected VFENE instruction used for the non-loop MVST, as well as other instructions, is a modified version, referred to as VFENE_modifiedcc, in which the behavior of the condition code (cc) is changed, as described below. With the modified version of VFENE, only the termination character (e.g., 0) is searched, not the unequal characters. Thus, both the second operand (e.g., eVR1) and the third operand (e.g., eVR1) include the same data, and the comparison yields no unequal character. Further, RXB, $M_4$ and $M_5$ are not provided and when the terminating character (e.g., 0) is encountered, the cc is set to 1; otherwise, the cc is set to 3.

In another implementation, the VFENE may be implemented to include the processing of the two Add instructions: VFENE_modifiedcc_updated address VR1, VR2, R1, R2.

Figure 7:
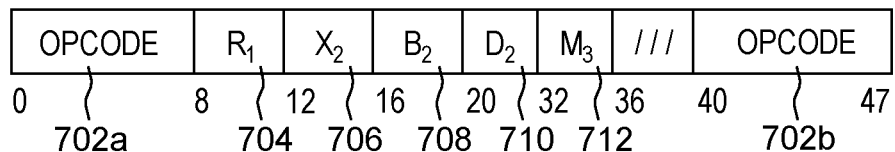
FIG. 7 depicts one example of a Load Count To Block Boundary instruction used in accordance with an aspect of the present invention.

Another operation indicated above is LCBB (Load Count to Block Boundary). One embodiment of an architected version of the Load Count to Block Boundary instruction is described with reference to FIG. 7. This instruction provides, for instance, a count of the number of bytes of data from a specified address in memory to a specified memory boundary (e.g., it provides the number of bytes loaded in a register without crossing a specified memory boundary).

In one example, the Load Count to Block Boundary instruction 700 includes opcode fields 702*a* (e.g., bits 0-7), 702*b* (e.g., bits 40-47) indicating a Load Count to Block Boundary operation; a register field 704 (e.g., bits 8-11) used to designate a general purpose register ($R_1$); an index field ($X_2$) 706 (e.g., bits 12-15); a base field ($B_2$) 708 (e.g., bits 16-19); a displacement field ($D_2$) 710 (e.g., bits 20-31); and a mask field ($M_3$) 1012 (e.g., bits 32-35). Each of the fields 704-712, in one example, is separate and independent from the opcode field(s). Further, in one embodiment, they are separate and independent from one another; however, in other embodiments, more than one field may be combined. Further information on the use of these fields is described below.

In one example, the contents of general registers designated by the $X_2$ and $B_2$ fields are added to the contents of the $D_2$ field to form the second operand address. The displacement, $D_2$, for the Load Count to Block Boundary instruction is treated as a 12 bit unsigned integer, in one example. The second operand address is used to indicate a location in main memory; however, it is not used to address data, in this embodiment.

The $M_3$ field, in one embodiment, specifies a code that is used to signal the CPU as to the block boundary size to compute the number of possible bytes to load without crossing a memory boundary. If a reserved value is specified, a specification exception is recognized, in one example. Example codes and corresponding values are as follows:

| Code | Boundary |
|------|----------|
| 0 | 64-Byte |
| 1 | 128-Byte |
| 2 | 256-Byte |
| 3 | 512-Byte |
| 4 | 1K-Byte |
| 5 | 2K-Byte |
| 6 | 4K-Byte |

In a further example, the boundary size is not included in the instruction, but instead, is dynamically determined by the processor executing the instruction. For instance, the $M_3$ field specifies the type of boundary (e.g., cache line, page, etc.), and based on the type and one or more characteristics of the processor (e.g., cache line size for the processor; page size for the processor; etc.), the processor determines the boundary. As examples, based on the type, the processor uses a fixed size for the boundary (e.g., pre-defined fixed cache line or page size for the processor), or based on the type, the processor determines the boundary. For instance, if the type is a page boundary, the processor looks up the start address in a Translation Look-aside Buffer (TLB) and determines the page boundary therefrom. Other examples also exist. For example, the type may be provided by another field of the instruction or from a control outside of the instruction.

In execution of one embodiment of the Load Count to Block Boundary instruction, an unsigned binary integer (e.g., 64-bits) containing the number of bytes possible to load from the second operand location without crossing a specified block boundary, capped at, for instance, the size of a register to be loaded (e.g., 16), is placed in the general purpose register specified in the first operand.

Resulting from execution of the instruction, an optional condition code is set, such as, for example:

0—Operand one is sixteen
1—
2—
3—Operand one is less than sixteen

In the example instruction above, the starting address from which the count is to begin is determined by the index register value ($X_2$) plus a base register value ($B_2$) plus a displacement ($D_2$); however, in other embodiments, it is provided by a register value; an instruction address plus instruction text specified offset; a register value plus displacement; or a register value plus index register value; as just some examples.

In accordance with an aspect of the present invention, the version of the architected LCBB instruction used for the non-loop MVST, as well as other instructions, is a modified version, referred to as LCBB_nocc, in which no condition code is set, unlike with the architected version of LCBB. With the modified version, $X_2$, $B_2$ and $D_2$ are replaced by R1; $V_1$ is replaced by eR1; the $M_3$ field is replaced by <boundary>; and no condition code is set. This operation computes, e.g., the number of bytes loaded by VLBB.

Figure 8:
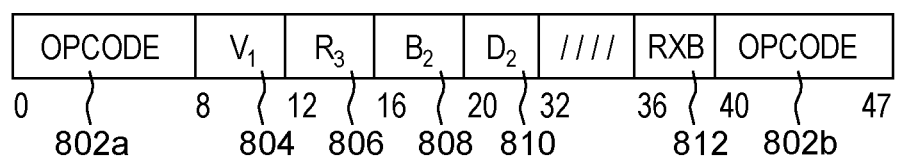
FIG. 8 depicts one example of a Vector Store With Length instruction used in accordance with an aspect of the present invention.

Another operation used in the non-loop version of MVST (as well as others) is a vector store with length operation. Thus, one example of an architected version of the Vector Store with Length (VSTL) instruction is described with reference to FIG. 8. In one example, the Vector Store with Length instruction 800 includes opcode fields 802a (e.g., bits 0-7), 802b (e.g., bits 40-47) indicating a vector store with length operation; a register field 804 (e.g., bits 8-11) used to designate a vector register ($V_1$); a register field ($R_3$) 806 (e.g., bits 12-15); a base field ($B_2$) 808 (e.g., bits 16-19); a displacement field ($D_2$) 810 (e.g., bits 20-31); and a RXB field 812 (e.g., bits 32-35). Each of the fields 804-812, in one example, is separate and independent from the opcode field(s). Further, in one embodiment, they are separate and independent from one another; however, in other embodiments, more than one field may be combined. Further information on the use of these fields is described below.

The content of the base register added to the displacement creates a value. The displacement for the Vector Store With Length instruction is treated as a 12-bit unsigned integer.

In operation, in one embodiment of the architected version, proceeding from left to right, bytes from the first operand are stored at the second operand location. The general register specified by the third operand contains a 32-bit unsigned integer containing a value that represents the highest indexed byte to store. If the third operand contains a value greater than or equal to the highest byte index of the vector, all bytes of the first operand are stored.

Access exceptions are only recognized on bytes stored.

In accordance with an aspect of the present invention, the version of the architected VSTL instruction used for the non-loop MVST, as well as other instructions, is a modified version, referred to as VSTL_nocc, in which no condition code is set. In one embodiment, the parameters of the VSTL with suppressed condition code, used in the non-loop sequence, are set such that B2 corresponds to R2 and D2 to 0; V1 is set to eVR1 and R3 is set to eR2. In another embodiment, the operands of the non-loop version of VSTL are not explicitly specified and one or more operands of the modified version are set, as follows: $B_2$ and $D_2$ are replaced by R2; $V_1$ is replaced by eVR1; and $R_3$ is replaced by L=<eR2>.

In addition to the above operations, other operations, such as a minimum operation corresponding to an architected MIN instruction, and add operations corresponding to architected Add instructions are provided. As indicated above, the min operation and the first add operation of the non-loop sequence of operations are modified from their architected counterparts in that they do not set a condition code. Furthermore, in at least one embodiment, the min operation used in the non-loop sequence is equipped to receive at least one input operand from a vector register in lieu of an integer register. (In another embodiment, the vector register is first transferred to an integer register and the modified min operation receives two integer register input operands.) Similarly, the second add operation of the non-loop sequence is modified from its architected counterpart in that it performs the add only if the condition code of the VFENE is, e.g., 3, and it does not set the condition code.

As described herein, in one embodiment, an implementation of a Move String instruction is provided that avoids the high cost of microcode start-up and/or exit; reduces the cost associated with double loops; and, in one example, takes advantage of the high-performance string SIMD (single instruction, multiple data) facility (e.g., the vector facility). This implementation uses a non-loop configuration sequence of operations to perform the copy loop operation of the architected MVST instruction. In one example, it is particularly efficient for short strings, which are frequent in many application spaces.

Another instruction that may be implemented, in accordance with an aspect of the present invention, is a Compare Logical String (CLST) instruction. The Compare Logical String instruction is used to compare a second operand designated by general register $R_2$ to a first operand location designated by general register $R_1$. The comparison is made, e.g., left to right, byte by byte, until unequal bytes are compared, an ending character specified in general register 0 is encountered in either operand, or a CPU-determined number of bytes have been compared. The condition code is set to 0 if the two operands are equal; to 1 if the first operand is low; to 2 if the second operand is low; or to 3 if a CPU-determined number of bytes have been compared. If the ending character is found in both operands simultaneously, the operands are equal. If it is found in only one operand, than the operand is low.

Figure 9:
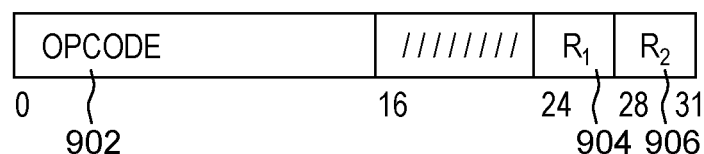
FIG. 9 depicts one example of a Compare Logical String instruction used in accordance with an aspect of the present invention.

One example of a Compare Logical String instruction, as architecturally defined, e.g., in the z/Architecture, is described with reference to FIG. 9. In one example, a Compare Logical String instruction 900 includes an operation code (opcode) field 902 (e.g., bits 0-15) that includes an opcode to specify a compare logical string operation; a first register field ($R_1$) 904 (e.g., bits 24-27); and a second register field ($R_2$) 906 (e.g., bits 28-31). In one embodiment, the fields of the instruction are separate and independent from one another. However, in another embodiment, more than one field may be combined. Further, a subscript number associated with a field of the instruction denotes the operand to which the field applies. For instance, any field having a subscript 1 is associated with a first operand, and any field having a subscript 2 is associated with a second operand.

In operation of one embodiment of an architected Compare Logical String instruction, the first operand is compared with the second operand until unequal bytes are compared, the end of either operand is reached, or a CPU-determined number of bytes have been compared, whichever occurs first. The CPU-determined number is at least 256, in one example. The result is indicated in the condition code.

The location of the leftmost byte of the first operand and the second operand is designated by the contents of general registers $R_1$ and $R_2$, respectively.

The handling of the addresses in general registers $R_1$ and $R_2$ is dependent on the addressing mode. In the 24-bit addressing mode, the contents of bit positions 40-63 of general registers $R_1$ and $R_2$ constitute the address, and the contents of bit positions 0-39 are ignored. In the 31-bit addressing mode, the contents of bit positions 33-63 of the registers constitute the address, and the contents of bit positions 0-32 are ignored. In the 64-bit addressing mode, the contents of bit positions 0-63 constitute the address.

The first and second operands may be of the same or different lengths. The end of an operand is indicated by an ending character in the last byte position of the operand. The ending character to be used to determine the end of an operand is specified in bit positions 56-63 of general register 0. Bit positions 32-55 of general register 0 are reserved for possible future extensions and are to contain zeros; otherwise, a specification exception is recognized, in one example.

The operation proceeds left to right, byte by byte, and ends as soon as the ending character is encountered in either or both operands, unequal bytes which do not include an ending character are compared, or a CPU-determined number of bytes have been compared, whichever occurs first.

The CPU-determined number is at least 256, in one example. When the ending character is encountered simultaneously in both operands, including when it is in the first byte position of the operands, the operands are of the same length and are considered to be equal, and condition code 0 is set. When the ending character is encountered in only one operand, that operand, which is the shorter operand, is considered to be low, and condition code 1 or 2 is set. Condition code 1 is set if the first operand is low, or condition code 2 is set if the second operand is low. Similarly, when unequal bytes which do not include an ending character are compared, condition code 1 is set if the lower byte is in the first operand, or condition code 2 is set if the lower byte is in the second operand. When a CPU-determined number of bytes have been compared, condition code 3 is set.

When condition code 1 or 2 is set, the address of the last byte processed in the first and second operands is placed in general registers $R_1$ and $R_2$, respectively. That is, when condition code 1 is set, the first operand is low and the address of the ending character or first unequal byte in the first operand, whichever was encountered, is placed in general register $R_1$, and the address of the second operand byte corresponding in position to the first operand byte is placed in general register $R_2$. When condition code 2 is set, the first operand is high and the address of the ending character or first unequal byte in the second operand, whichever was encountered, is placed in general register $R_2$, and the address of the first operand byte corresponding in position to the second operand byte is placed in general register $R_1$. When condition code 3 is set, the CPU-determined number of bytes are equal and the address of the next byte to be processed in the first and second operands is placed in general registers $R_1$ and $R_2$, respectively. Whenever an address is placed in a general register, bits 32-39 of the register, in the 24-bit addressing mode, or bit 32 in the 31-bit addressing mode, are set to zeros. Bits 0-31 of the $R_1$ and $R_2$ registers remain unchanged in the 24-bit or 31-bit mode.

When condition code 0 is set, the entire operands are equal and the contents of general registers $R_1$ and $R_2$ remain unchanged.

The amount of processing that results in the setting of condition code 3 is determined by the CPU on the basis of improving performance, and it may be a different amount each time the instruction is executed.

Access exceptions for the first and second operands are recognized for that portion of the operand which is necessarily examined in the operation.

Figure 10A:
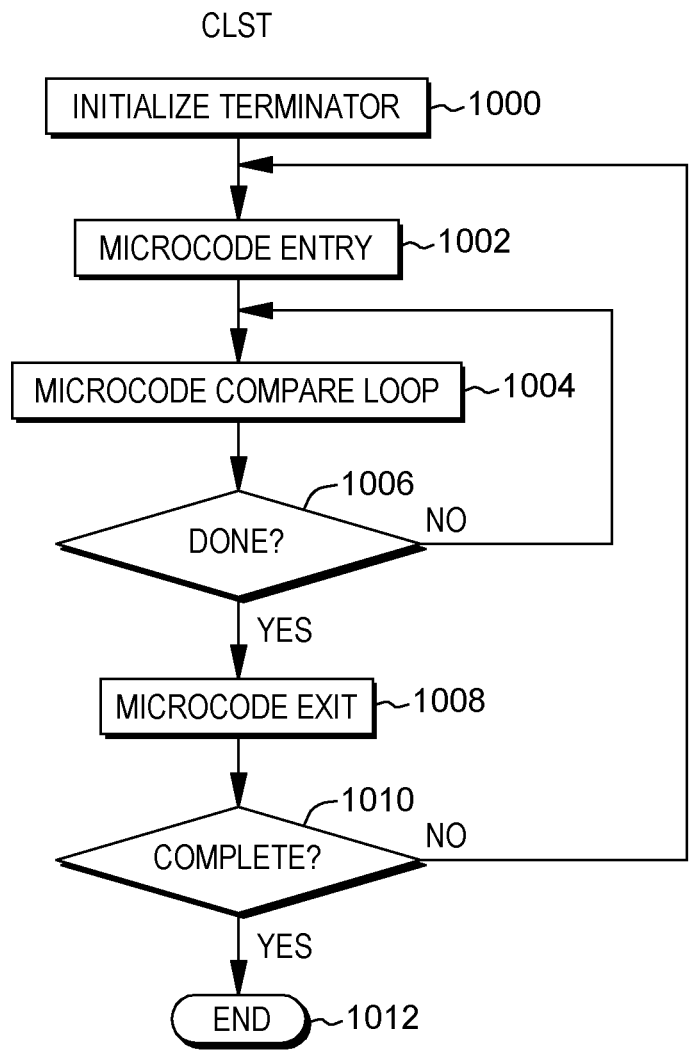
FIG. 10A depicts one implementation of the Compare Logical String instruction of FIG. 9.

One implementation of the Compare Logical String instruction uses microcode, which includes an expensive entry into and exit out of microcode processing. This is shown in FIG. 10A. Also shown in FIG. 10A is additional processing wrapped around the instruction implementation including, for instance, an initialization step (e.g., STEP 1000) and a completion check (e.g., INQUIRY 1010), described below.

As depicted in FIG. 10A, in one implementation, a terminator is initialized, STEP 1000. For instance, a zero may be set as a termination character, such that when zero is encountered, it indicates the end of a character string being processed. Then, the instruction begins processing, in which microcode processing is entered, STEP 1002, and a CLST compare loop begins, STEP 1004. This loop is performed in microcode and includes comparing each character of the strings, as described above. For instance, from left to right, the characters are compared. After a pair of characters is compared, a determination is made as to whether all of the characters of the strings have been compared or whether a CPU-determined number of characters of the string have been compared, INQUIRY 1006. If comparing is to continue, then processing continues with STEP 1004. Otherwise, microcode processing is exited, STEP 1008, terminating instruction execution.

Thereafter, a check loop (separate from CLST processing) begins in which a determination is made as to whether all of the characters of the strings have been compared or if additional characters are to be compared, INQUIRY 1010. If comparing is to continue, then microcode is re-entered, STEP 1002, and comparing continues, STEP 1004. If comparing is complete, then the check loop ends, STEP 1012.

In accordance with an aspect of the present invention, in another implementation of CLST, referred to herein as the non-loop version, the microcode entry and exit processing is avoided, as well as the CLST compare loop of the above-described processing. Instead, the comparing of the CLST compare loop is performed by providing a cracked or expanded sequence of operations that are to compare up to a predetermined amount of data, such as a predefined number of bytes (e.g., 16 bytes) without looping (referred to herein as concurrently). This non-loop version of CLST processing is described further with reference to FIG. 10B.

In one example, the expanded sequence of operations is provided (e.g., generated) by an instruction decode unit and executed by one or more execution units. In one embodiment, the expansion is to straight-line (i.e., non-looping) code, corresponding to the CLST compare loop, that processes up to a predetermined amount of data (e.g., a defined number of units), such as, for instance, 16 bytes per expanded CLST. Consistent with the architected definition of CLST, subsequent to performing the expanded sequence of instructions, a check is made of the condition code and a loop may then be performed (e.g., corresponding to the check loop) until all the bytes of the strings have been processed and a string terminator has been found. However, unlike the architected version, the CLST compare loop is not performed, and in accordance with an aspect of the present invention, the sequence of operations does not load past a specified boundary, such as a page or cache line boundary, as examples. This facilitates processing and improves system performance by eliminating checks for the specified boundary and processing associated therewith. This is further described below.

Figure 10B:
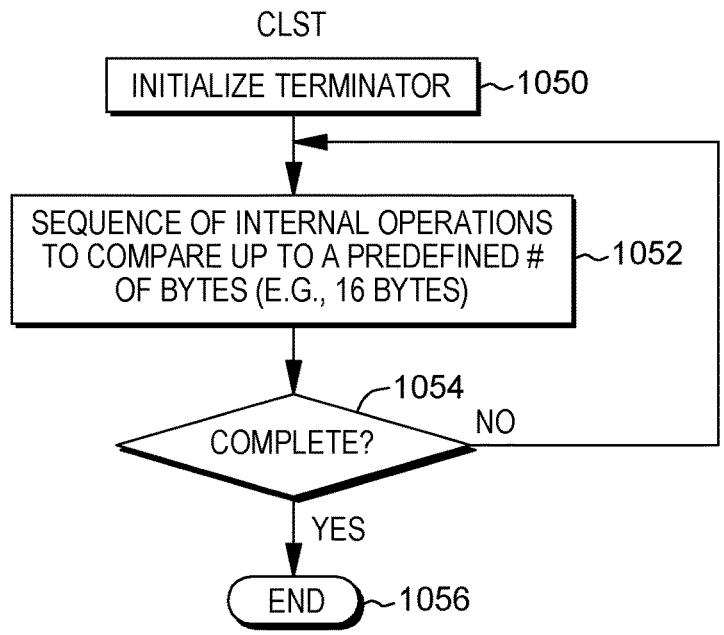
FIG. 10B depicts another implementation of the Compare Logical String instruction of FIG. 9, in accordance with an aspect of the present invention.

Referring to FIG. 10B, in one embodiment, a terminator is initialized, STEP 1050. Additionally, a sequence of operations corresponding to the CLST instruction is provided by an instruction decode unit and executed via one or more execution units to perform the comparing, STEP 1052. This comparing is performed without entering or exiting microcode processing. The sequence of operations compares up to a predetermined amount of data (e.g., a predefined number of bytes (e.g., 16 bytes)) without looping in the CLST compare loop. For instance, in one implementation, vector units are used to compare the 16 bytes concurrently. The predetermined amount of data includes bytes of the string up to and including the termination character, assuming the string is less than a defined number of bytes, e.g., 16; a defined number of bytes (e.g., 16); or up to a specified boundary, such as a page boundary or a cache line boundary, as examples.

Subsequent to performing the non-loop sequence of operations, a determination is made as to whether the comparing is complete; i.e., whether there are more than the defined number (e.g., 16) of bytes of data to be compared, INQUIRY 1054. If the comparing is not complete, then the check loop is entered and processing continues, STEP 1052. Otherwise, processing ends, STEP 1056.

In a further example, the modified, non-loop implementation of the Compare Logical String instruction is used when the string includes a selected termination character, such as zero; otherwise, the architected microcode implementation is used. This is described further with reference to FIG. 10C.

Figure 10C:
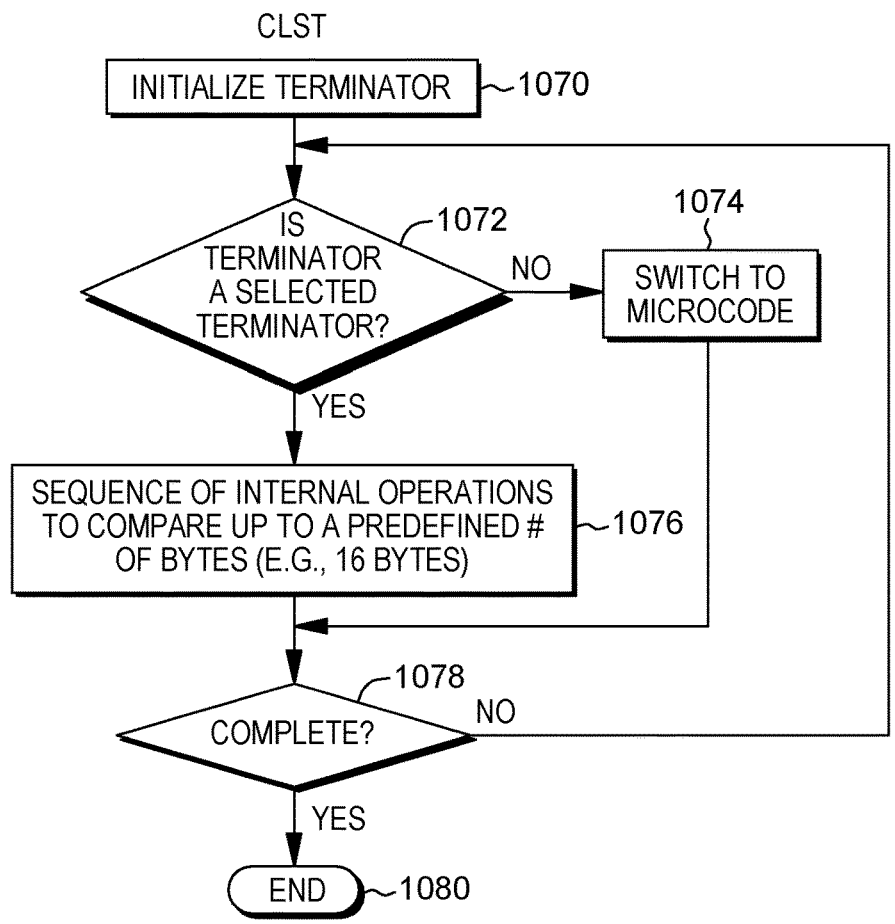
FIG. 10C depicts another implementation of the Compare Logical String instruction of FIG. 9, in accordance with an aspect of the present invention.

As shown in FIG. 10C, a terminator is initialized, STEP 1070, and a determination is made as to whether the terminator is a specific value, such as 0, INQUIRY 1072. If the initialized terminator is not the selected terminator value (e.g., 0), then the microcode implementation is used, in one embodiment (e.g., via an internal trap using CGIT), STEP 1074. Otherwise, the modified, non-loop implementation that uses a sequence of internal operations, instead of entering/exiting microcode is used. For instance, a sequence of operations is provided using a decode unit and executed by one or more execution units to perform the comparing, STEP 1076. This is accomplished without entering microcode processing. The sequence of operations compares up to a predetermined amount of data (e.g., a predefined number of bytes (e.g., 16 bytes)) without looping in the compare loop. The predetermined amount of data includes bytes of the string up to and including the termination character, assuming the string is less than a defined number of bytes, e.g., 16; a defined number of bytes (e.g., 16); or up to a specified boundary, such as a page boundary or a cache line boundary, as examples.

Subsequent to performing the non-loop sequence of operations or the microcode, a determination is made as to whether the comparing is complete; i.e., whether there are more than the defined number (e.g., 16) of bytes of data to be compared INQUIRY 1078. If the comparing is not complete, then the check loop is entered and processing continues, STEP 1072. Otherwise, processing ends, STEP 1080.

One example of a sequence of internal operations that may be used to perform the CLST compare is described below. The decode unit generates or selects this sequence of operations when the non-loop version of the CLST instruction is to be executed. In the below internal operations, <R0>, <R1>, and <R2> refer to the architected registers r0, r1, r2, or their renamed physical variants; eR1, eR2 refer to non-loop internal general purpose registers (or their physical counterparts) used by expanded code sequences; and eVR1, eVR2 refer to non-loop internal vector registers (or their physical counterparts) used by expanded code sequences. The suffix modifiedcc indicates that the treatment of the condition code for the suffixed operation is different from the architected version (the architected version corresponding to the architected instruction) of how the condition code is handled. The suffix nocc refers to no condition code in that the condition code is not set for the suffixed operation as defined in the architected versions. The suffix nocc_cond indicates that the operation associated therewith is performed for a particular condition, and that the condition code is not set, which again is different for the architected version of the instruction to which this pertains.

One example sequence of operations for CLST is described below. Embodiments of the operations are described above.

VLBB <eVR1>, <R1>, <boundary>

Loads into eVR1 a number of bytes (e.g., 16) up to a selected boundary, e.g., page or cache line boundary VLBB <eVR2>, <R2>, <boundary>

Loads into eVR2 a number of bytes (e.g., 16) up to a selected boundary, e.g., page or cache line boundary; load 2 registers for the compare VFENE_modifiedcc <eVR2>, <eVR1>, <eVR2>

Find terminator condition

LCBB_nocc <eR1>, <R1>, <boundary>

Compute number of bytes loaded by VLBB for first operand

LCBB_nocc <eR2>, <R2>, <boundary>

Compute number of bytes loaded by VLBB for second operand

MIN_nocc <eR1>, <eR2>

Determine minimum count of loaded operand bytes

MIN_clstcc <eR1>, <eVR2>

Determine minimum count of loaded operand bytes and mismatch or of terminator, setting condition code to 3 if no mismatch or terminator found A_nocc <R1>, <eR1>

Add the number of processed bytes (eR1) to register R1

A_nocc_cond <R2>, <eR1>

Add the number of processed bytes (eR1) to register R2, if the cc flag value is 1, 2 or 3. This instruction adds the second operand register to the first operand register, if the condition code is 1, 2 or 3. (Other embodiments and condition code handling are possible, e.g., using a predicated instruction, a conditional move of an unconditional add into a temporary register, etc.)

In this aspect of the present invention, for the non-loop CLST, the VFENE architected instruction is modified in which the following condition codes are set: 0-entire operands equal, registers eVR1 and eVR2 unchanged; 1-first operand low, general registers eVR1 and eVR2 updated with addresses of last bytes processed; and 2-first operand high, general registers eVR1 and eVR2 updated with addresses of last bytes processed.

Further, MIN_clstcc is a modified minimum instruction which selects the lesser of its two input operands. MIN_clstcc leaves the condition code unmodified if the first input operand is less than the second operand, and sets it to 3 if the second operand is less.

In another embodiment, the minimum instruction is replaced with a sequence of instructions. In yet another embodiment, a single minimum instruction is provided which computes the minimum of <eR1>, <eR2> and <eVR2>, setting the condition code to 3 if the third operand <eVR2> is chosen. Other variations are possible.

In one or more other embodiments, different internal operations may be used, and/or the internal operations may be reordered. In one or more embodiments, multiple internal operations may be combined, for example, the load count to boundary operation and a subsequent minimum operation may be implemented as a single internal operation. Other possibilities exist.

As examples, the operations of the non-loop sequence of operations may have different opcodes than their corresponding architected instructions, or they may have the same opcodes, but a flag is set indicating that the non-loop versions are to be processed. Other examples are also possible.

As described herein, in one embodiment, an implementation of a Compare Logical String instruction is provided that avoids the high cost of microcode start-up and/or exit; reduces the cost associated with double loops; and, in one example, takes advantage of the high-performance string SIMD facility. This implementation uses a non-loop configuration sequence of operations to perform the compare loop operation of the architected CLST instruction. In one example, it is particularly efficient for short strings, which are frequent in many application spaces.

In one or more implementations of each of the above instructions (i.e., MVST and CLST), as well as other string instructions, the termination character is 0. However, in one or more other embodiments, an arbitrary termination character may be used. This character may be any selected character, including 0 or any other defined character. To support use of an arbitrary character, the termination character may be transferred to a vector unit (or other unit in another embodiment) and replicated.

Figure 11A:
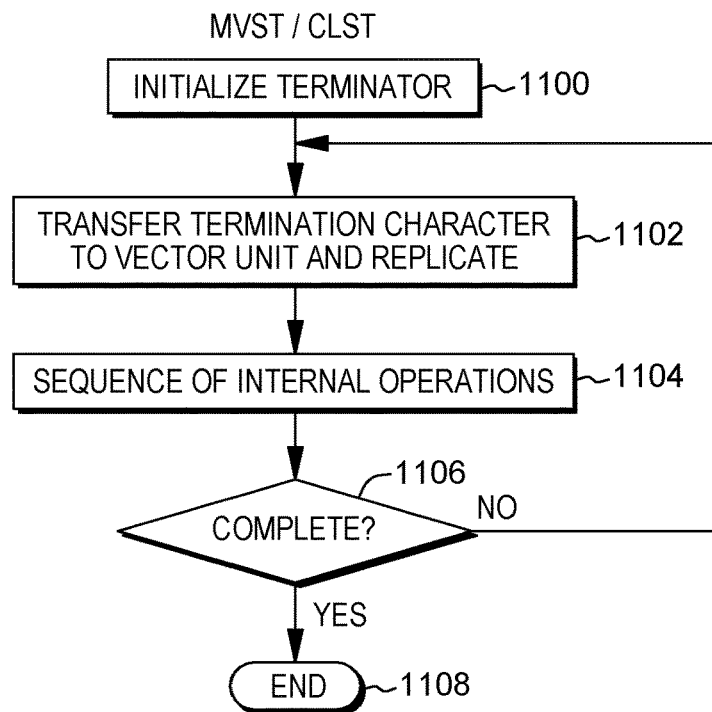
FIG. 11A depicts another implementation of the Move String or Compare Logical String instruction, in accordance with an aspect of the present invention.

For example, as shown in FIG. 11A, in one embodiment, a terminator is initialized to a selected value, STEP 1100, and transferred to a vector unit and replicated, STEP 1102. In one example, a vector replicate instruction (e.g., VREP <eVR0>, <R0>) is used to replicate the termination character in register R0 to, e.g., all positions of eVR0. This replicated termination character may then be used by the non-loop configured versions of MVST, CLST and/or other string instructions.

As an example, a sequence of internal operations is provided (e.g., generated) by an instruction decode unit and executed by one or more execution units to perform the appropriate operation (e.g., copying for MVST, comparing for CLST, etc.), STEP 1104. This is accomplished without entering or exiting microcode processing. The internal operations perform the specified operation on up to a predetermined amount of data (e.g., a predefined number of bytes (e.g., 16 bytes)) without performing the copy/compare loop, as described above. Subsequent to performing the sequence of operations, a determination is made as to whether the operation is complete; i.e., whether there are more than the predetermined amount of data (e.g., 16 bytes) to be processed, INQUIRY 1106. If the operation is not complete, then the check loop processing is entered and the operation continues, STEP 1102. Otherwise, processing ends, STEP 1108.

One example of the sequence of operations, and additionally an initial replicate operation, includes:

VREP <eVR0>, <R0>
VLBB <eVR1>, <R1>, <boundary>
VFEE_modifiedcc <eVR2>, <eVR1>, <eVR0>
LCBB_nocc <eR1>, <R1>, <boundary>
MIN_nocc <eR2>, <eR1>, <eVR2>
VSTL_nocc <eVR1>, <R2>, L=<eR2>
A_nocc <R1>, <eR2>
A_nocc_cond <R2>, <eR2>

Each of the operations is described above, except VFEE, which is described below.

Figure 6B:
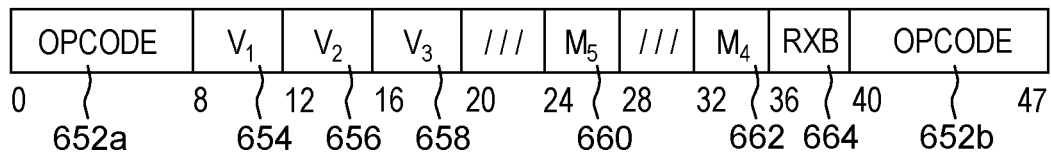
FIG. 6B depicts one example of a Vector Find Element Equal instruction used in accordance with an aspect of the present invention.

In one example, referring to FIG. 6B, a Vector Find Element Equal (VFEE) instruction 650 includes opcode fields 652a (e.g., bits 0-7), 652b (e.g., bits 40-47) indicating a Vector Find Element Equal operation; a first vector register field 654 (e.g., bits 8-11) used to designate a first vector register ($V_1$); a second vector register field 656 (e.g., bits 12-15) used to designate a second vector register ($V_2$); a third vector register field 658 (e.g., bits 16-19) used to designate a third vector register ($V_3$); a first mask field ($M_5$) 660 (e.g., bits 24-27); a second mask field ($M_4$) 662 (e.g., bits 32-35); and an RXB field 664 (e.g., bits 36-39). Each of the fields 654-664, in one example, is separate and independent from the opcode field(s). Further, in one embodiment, they are separate and independent from one another; however, in other embodiments, more than one field may be combined. Further information on the use of these fields is described below.

The $M_4$ field having, for instance, four bits, 0-3, specifies an element size control in, for instance, bits 1-3. The element size control specifies the size of the elements in the vector register operands. In one example, the element size control can specify a byte, a halfword (e.g., 2 bytes) or a word (e.g., 4 bytes). For instance, a 0 indicates a byte; a 1 indicates a halfword; and a 2 indicates a word, a.k.a., fullword. If a reserved value is specified, a specification exception is recognized.

The $M_5$ field is, for instance, a four bit field, bits 0-3, including, for instance:

A zero search field (ZS, bit 2), which if one, each element of the second operand is also compared for equality to zero. (In a further example, it is each element of the third operand or another operand that is compared to zero.); and A condition code set field (CS, bit 3), which if zero, the condition code is not set and remains unchanged. If one, the condition code is set as specified below, as an example:
  0—If the zero search bit is one, in the second operand there were no equal comparisons in an element with an index less than an element whose contents are zero.
  1—Comparison detected a match between the second and third operands in some element. If the ZS-bit is one, there were no zero comparisons in the second operand.
  2 If the ZS-bit is one, there was a match between the second and third operands with a lower index than a match with zero in the second operand.
  3. No elements compared equal. Additionally, if the ZS-bit is one, no elements contain zero.

In execution of one embodiment of the architected Vector Find Element Equal instruction, proceeding in one embodiment from left to right, the elements of the second operand (included in the vector register specified by $V_2$ and its extension bit) are compared with the corresponding elements of the third operand (included in the vector register specified by the $V_3$ field plus its extension bit) and optionally with zero. If two elements are equal, a byte index of the first byte of the leftmost equal element is placed in a specified byte (e.g., byte 7) of the first operand (designated in the register specified by $V_1$ and its extension bit), and zeros are stored to the remaining bytes of the first operand. If no bytes are found to be equal, or are equal to zero if the zero search (ZS) bit is one, an index equal to the number of bytes in the vector is stored in byte seven of the first operand. Zeros are stored in the remaining bytes.

In one example, the byte index of the element that is returned (e.g., stored in the specified byte) is the index of the first byte of the leftmost element that is equal. For instance, if the element size is byte, then the index of the leftmost equal element is returned (e.g., if there are 16 elements, 0-15, and element 6 is unequal, then byte index 6 is returned). Similarly, if the element size is halfword, and there are 8 elements, 0-7, and either byte 6 or 7 of element three is equal, then byte index 6 is returned. Likewise, if the element size is fullword and there are four elements, 0-3, and one of bytes 4-7 of element one is equal, byte index 4 is returned.

If the zero search bit is set in the $M_5$ field, each element in the second operand (or in other embodiments, the third operand or another operand) is also compared for equality with zero (a.k.a., null terminator, end of string, etc.). If a zero element is found in the second operand before any other element of the second operand and third operands are found to be equal, the byte index of the first byte of the element found to be zero is stored in the specified byte (e.g., byte 7) of the first operand (e.g., in $V_1$ of the architected version). Zeros are stored in all other bytes, and if the condition code set flag is one, a selected condition code (e.g., condition code zero) is set.

In one embodiment, the comparison of the elements is performed in parallel. For instance, if the registers being compared are 16 bytes in length, then 16 bytes are compared in parallel. In other embodiments, the units of data may be other than bytes, and the number of compares in parallel corresponds to the unit size. Further, in another embodiment, the direction of the vectors, left-to-right or right-to-left, is provided at runtime. For instance, the instruction accesses a register, status control or other entity that indicates the direction of processing as either left-to-right or right-to-left, as examples. In one embodiment, this direction control is not encoded as part of the instruction, but provided to the instruction at runtime.

In a further embodiment, the instruction does not include the RXB field. Instead, no extension is used or the extension is provided in another manner, such as from a control outside of the instruction, or provided as part of another field of the instruction.

In accordance with an aspect of the present invention, the version of the architected VFEE instruction used for the non-loop instructions, is a modified version, referred to as VFEE_modifiedcc, in which the behavior of the condition code (cc) is changed. With the modified version, RXB, $M_4$ and $M_5$ are not provided and when the terminating character (e.g., 0) is encountered, the cc is set to 1; otherwise, the cc is set to 3.

Figure 11B:
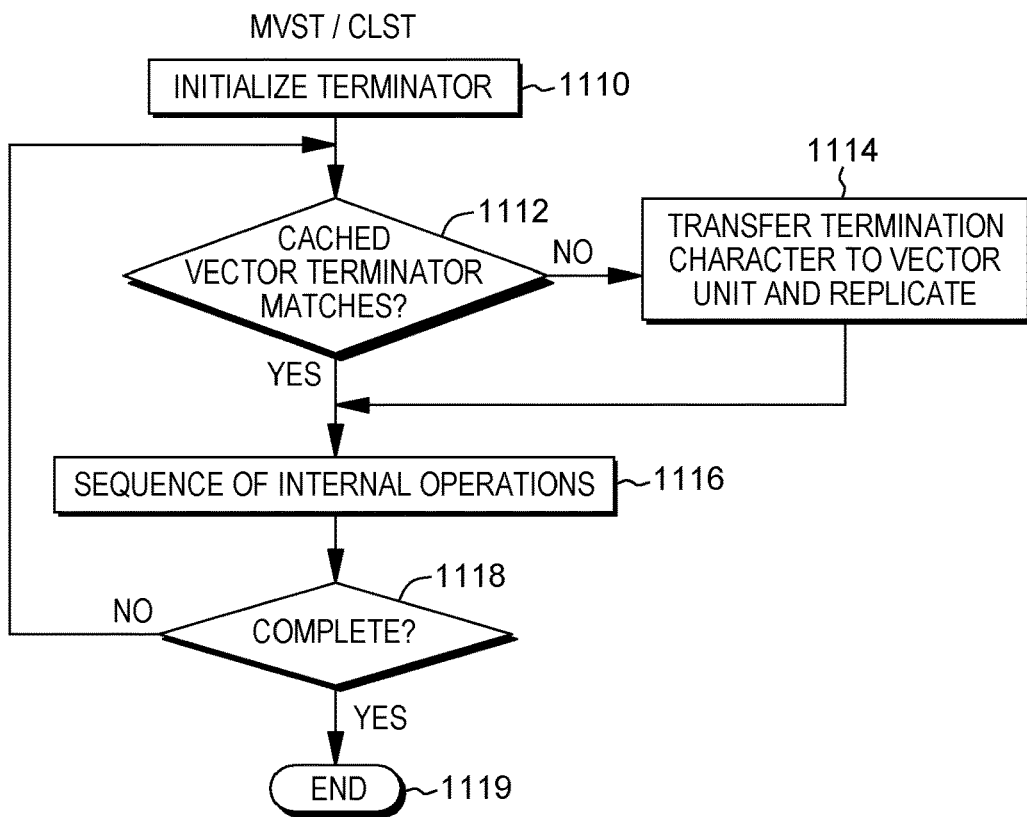
FIG. 11B depicts yet another implementation of the Move String or Compare Logical String instruction, in accordance with an aspect of the present invention.

In a further embodiment, referring to FIG. 11B, the latency of setting eVR0 is avoided. Instead, the most recent terminator value is cached in a selected location, e.g., a register, such as a vector register. Initially, a terminator is initialized, STEP 1110, and a determination is made as to whether a cached vector terminator matches the initialized terminator, INQUIRY 1112. If it does not match, then the termination character is transferred to the vector unit and replicated, STEP 1114, as described above. In one example, a compare vector to scalar instruction is used to compare the terminator character, and if necessary, branch to a VREP instruction to replicate the terminator (e.g., CVSJ <R0>, <eVR0>, EQ, cached_ok; compare vector to scalar replicate and jump—skip initialization of vector register if it is a replicated scalar as specified; cached_ok is at VLBB in the sequence of operations). Thereafter, or if the cached vector terminator does match, then processing continues with a sequence of internal operations used to perform the chosen operation (e.g., copy, compare or other operation) absent the copy/compare loop of the architected version, as described above, STEP 1116. A determination is made as to whether the copy/compare (or other) operation is complete, INQUIRY 1118. If so, processing ends, STEP 1119; otherwise, the check loop processing is entered and processing continues to INQUIRY 1112.

Figure 11C:
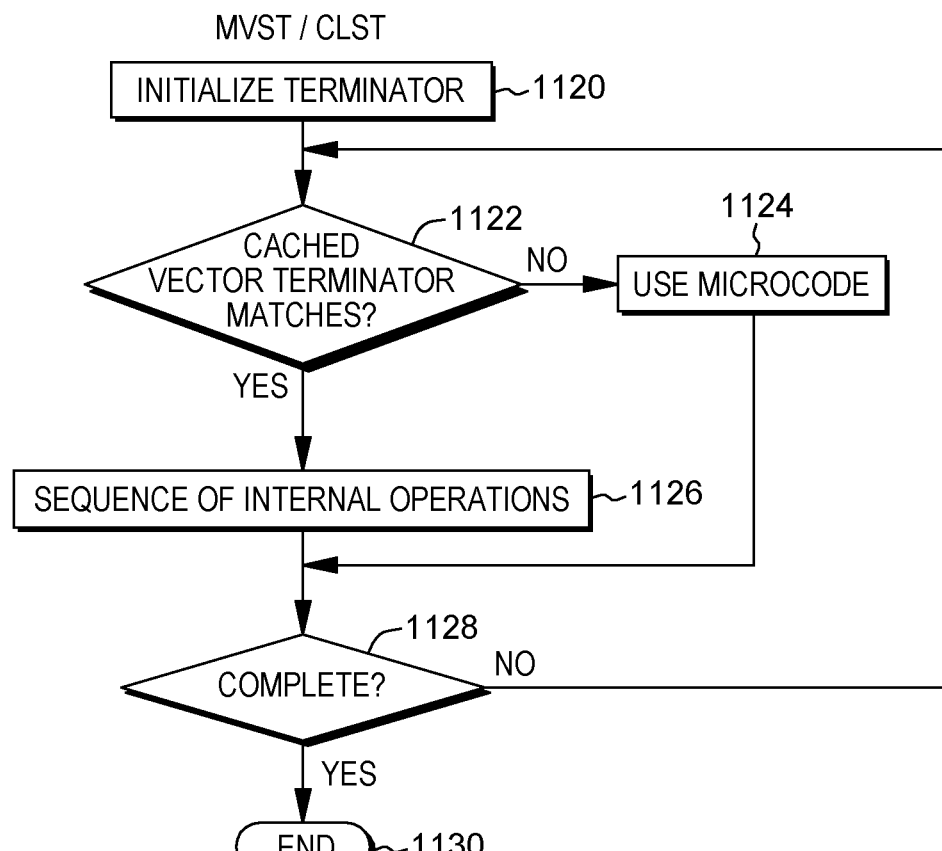
FIG. 11C depicts a further implementation of the Move String or Compare Logical String instruction, in accordance with an aspect of the present invention.

In yet a further embodiment, referring to FIG. 11C, a terminator is initialized, STEP 1120, and a determination is made as to whether a cached vector terminator matches the initialized terminator, INQUIRY 1122. If it does not match, then microcode is used to perform the copy or compare operation (or other operation), STEP 1124. However, if the cached vector terminator does match the initialized terminator, then a sequence of internal operations is used to perform the chosen operation (e.g., copy, compare or other operation) absent the copy/compare loop of the architected version, as described above, STEP 1126.

Subsequent to performing the sequence of operations or the microcode, a determination is made as to whether the copy/compare (or other) operation is complete, INQUIRY 1128. If so, processing ends, STEP 1130; otherwise, the check loop processing is entered and processing continues to INQUIRY 1122.

Figure 11D:
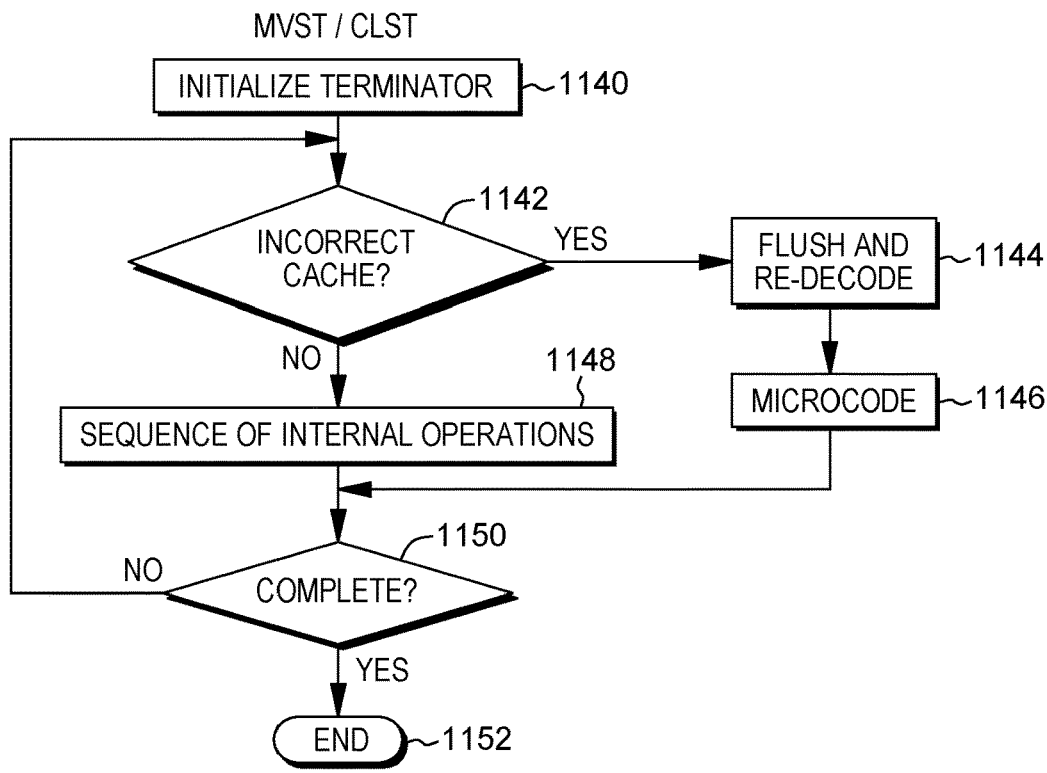
FIG. 11D depicts yet another implementation of the Move String or Compare Logical String instruction, in accordance with an aspect of the present invention.

In yet a further embodiment, referring to FIG. 11D, a terminator is initialized, STEP 1140, and a determination is made as to whether a cached terminator is equal to the initialized terminator, INQUIRY 1142. This test may execute in parallel and/or out-of-order with respect to the internal operations of STEP 1148. If the cached terminator is incorrect, the decoded internal operation sequence corresponding to STEP 1148 is flushed from the microprocessor pipeline and the string instruction (e.g., MVST, CLST, or other instruction) is re-decoded into a sequence transferring to microcode, STEP 1144, and the instruction (e.g., MVST, CLST or other instruction) is performed using microcode, STEP 1146. However, if the cached termination character is correct, then a sequence of internal operations is used to perform the chosen operation (e.g., copy, compare or other operation) absent the copy/compare loop of the architected version, as described above, STEP 1148. Thereafter, or subsequent to the microcode processing, a determination is made as to whether the chosen operation is complete, INQUIRY 1150. If so, processing ends, STEP 1152; otherwise, the check loop processing is entered and processing continues to INQUIRY 1142.

Figure 11E:
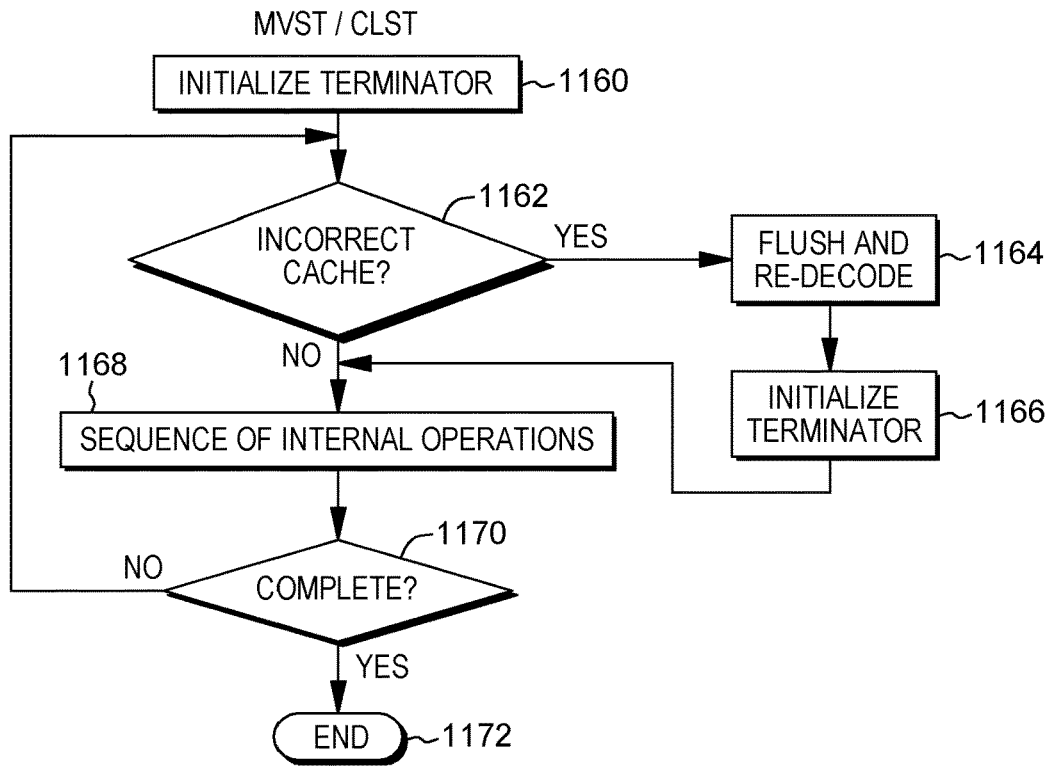
FIG. 11E depicts another implementation of the Move String or Compare Logical String instruction, in accordance with an aspect of the present invention.

In yet a further embodiment, referring to FIG. 11E, speculative decoding is performed. Initially, a terminator is initialized, STEP 1160, and a determination is made as to whether a cached version of the terminator is the same as the initialized terminator, INQUIRY 1162. This test may execute in parallel and/or out-of-order with respect to the internal operations of STEP 1168. If the cached version is incorrect, then the decoded internal operation sequence corresponding to STEP 1168 is flushed and the string instruction (e.g., MVST, CLST, or other instruction) is re-decoded in an alternate form updating the cached terminator in an example register, e.g., eVR0, STEP 1164. The terminator character in the register or other location used to cache a terminator is initialized again to the value of general register 0, STEP 1166. In one example, the VREP instruction is used to replicate the terminator character. After re-initializing the terminator, or if the speculatively decoded cached version is correct, a sequence of internal operations is used to perform the chosen operation (e.g., copy, compare, or other operation), STEP 1168. Thereafter, a determination is made as to whether the chosen operation is complete, INQUIRY 1170. If so, processing ends, STEP 1172; otherwise, the check loop processing is entered and processing continues to INQUIRY 1162.

In addition to the above, inline internal operation expansion may be used in implementation of other operations, including, but not limited to, pointer terminated character searches. For instance, a Search String (SRST) instruction is used to search, in a search loop (similar to the copy/compare loops described above) for a specified character (referred to as a search-for character). In accordance with an aspect of the invention, this instruction (and similar instructions) is implemented using a sequence of operations to perform the search in a non-loop configuration without entering/exiting microcode, such that the high cost of using microcode is avoided, and the cost associated with double loops is reduced. One or more aspects of the invention take advantage of the high-performance string SIMD facility.

Figure 12:
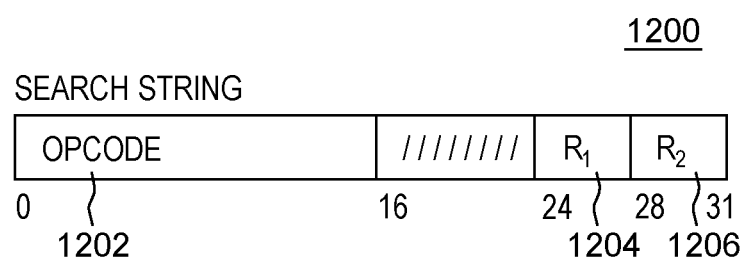
FIG. 12 depicts one example of a Search String instruction used in accordance with an aspect of the present invention.

One example of a Search String instruction, defined in accordance with the z/Architecture, is described with reference to FIG. 12. In one example, an architected Search String instruction 1200 includes an operation code field 1202 (e.g., bits 0-15) including an operation code (opcode) specifying a search string operation; a first register field ($R_1$) 1204 (e.g., bits 24-27); and a second register ($R_2$) field 1206 (e.g., bits 28-31). In one embodiment, the fields of the instruction are separate and independent from one another. However, in another embodiment, more than one field may be combined. Further, a subscript number associated with a field of the instruction denotes the operand to which the field applies. For instance, any field having a subscript 1 is associated with a first operand, and any field having a subscript 2 is associated with a second operand.

In operation of the Search String architected instruction, the second operand is searched until a specified character is found, the end of the second operand is reached, as designated by $R_1$, or a CPU-determined number of bytes have been searched, whichever occurs first. The CPU-determined number is, for instance, at least 256. The result is indicated in the condition code.

The location of the first byte of the second operand is designated by the contents of general register $R_2$. The location of the first byte after the second operand is designated by the contents of general register $R_1$.

The handling of the addresses in general registers $R_1$ and $R_2$ is dependent on the addressing mode. In the 24-bit addressing mode, the contents of bit positions 40-63 of general registers $R_1$ and $R_2$ constitute the address, and the contents of bit positions 0-39 are ignored. In the 31-bit addressing mode, the contents of bit positions 33-63 of the registers constitute the address, and the contents of bit positions 0-32 are ignored. In the 64-bit addressing mode, the contents of bit positions 0-63 constitute the address.

In the access-register mode, the address space containing the second operand is specified by means of access register $R_2$. The contents of access register $R_1$ are ignored.

The character for which the search occurs is specified in, e.g., bit positions 56-63 of general register 0. Bit positions 32-55 of general register 0 are reserved for possible future extensions and are to contain zeros, in one example; otherwise, a specification exception is recognized.

The operation proceeds, e.g., left to right and ends as soon as the specified character has been found in the second operand, the address of the next second operand byte to be examined equals the address in general register $R_1$, or a CPU-determined number of second operand bytes have been examined, whichever occurs first. The CPU-determined number is, for instance, at least 256. When the specified character is found, condition code 1 is set. When the address of the next second operand byte to be examined equals the address in general register $R_1$, condition code 2 is set. When a CPU-determined number of second operand bytes have been examined, condition code 3 is set. When the CPU-determined number of second operand bytes have been examined and the address of the next second operand byte is in general register $R_1$, it is unpredictable whether condition code 2 or 3 is set.

When condition code 1 is set, the address of the specified character found in the second operand is placed in general register $R_1$, and the contents of general register $R_2$ remain unchanged. When condition code 3 is set, the address of the next byte to be processed in the second operand is placed in general register $R_2$, and the contents of general register $R_1$ remain unchanged. When condition code 2 is set, the contents of general registers $R_1$ and $R_2$ remain unchanged. Whenever an address is placed in a general register, bits 32-39 of the register, in the 24 bit addressing mode, or bit 32, in the 31-bit addressing mode, are set to zeros. Bits 0-31 of the $R_1$ and $R_2$ registers remain unchanged in the 24-bit or 31-bit mode.

When the address in general register $R_1$ equals the address in general register $R_2$, condition code 2 is set immediately, and access exceptions are not recognized. When the address in general register $R_1$ is less than the address in general register $R_2$, condition code 2 can be set if the operand wraps around from the top of storage to location 0.

The amount of processing that results in the setting of condition code 3 is determined by the CPU on the basis of improving system performance, and it may be a different amount each time the instruction is executed.

Access exceptions for the second operand are recognized only for that portion of the operand that is necessarily examined.

Figure 13A:
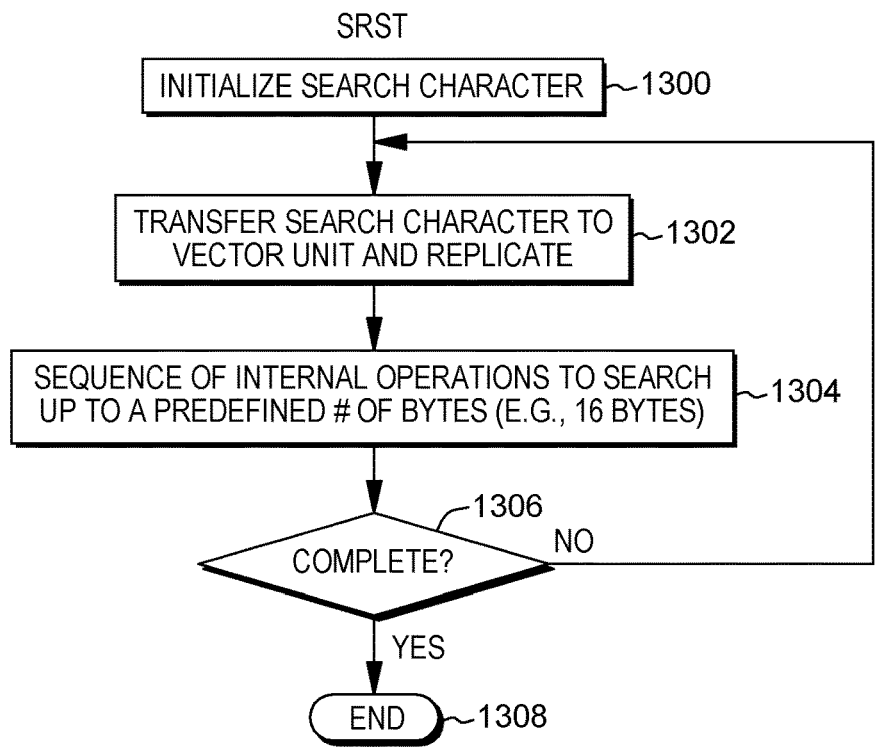
FIGS. 13A-13E depict implementations of the Search String instruction of FIG. 12, in accordance with aspects of the present invention.

In accordance with an aspect of the present invention, in one implementation, a sequence of non-loop operations is used, instead of microcode and a search loop, as shown in FIG. 13A.

For example, as shown in FIG. 13A, in one embodiment, a search character is initialized to a selected value, STEP 1300, and transferred to a vector unit and replicated, STEP 1302. In one example, a vector replicate instruction (e.g., VREP <eVR0>, <R0>) is used to replicate the search character in register R0 to, e.g., all positions of eVR0. This replicated search character may then be used by the non-loop configured version of SRST and/or other string instructions.

A sequence of internal operations is provided (e.g., generated) by an instruction decode unit and executed by one or more execution units to perform the appropriate operation (e.g., searching for SRST, etc.), STEP 1304. This is accomplished without entering or exiting microcode processing. The internal operations perform the specified operation on up to a predetermined amount of data (e.g., a predefined number of bytes (e.g., 16 bytes)) without performing a search loop, as described herein. Subsequent to performing the sequence of operations, a determination is made as to whether the operation is complete; i.e., whether there are more than the predetermined amount of data (e.g., 16 bytes) to be processed, INQUIRY 1306. If the operation is not complete, then the check loop processing is entered and the operation continues, STEP 1302. Otherwise, processing ends, STEP 1308.

One example of a sequence of operations to perform SRST, and additionally an initial replicate operation, includes:

VREP <eVR1>, <R0>
Searched character
VLBB <eVR2>, <R2>, <boundary>
Load into eVR2 a number of bytes (e.g., 16) up to a selected boundary, e.g., page or cache line boundary
VFEE_modifiedcc <eVR1>, <eVR1>, <eVR2>
Find search character
LCBB_nocc <eR2>, <R2>, <boundary>
Compute number of bytes loaded by VLBB
MIN_nocc <eR1>, <eR2>, <eVR1>
Determine the minimum of the loaded bytes (eR1) or the position of the search termination character (eVR1) to determine the total number of bytes (eR1)

A_nocc <eR1>, <R2>, <eR1>
Add the number of processed bytes to <R2>
UPDATE_srstcc <R2>, <eR1>, <R1>
Update <R2> with the value of <eR1> if <eR1> is less than <R1>, otherwise set condition code to 2.

Figure 13B:
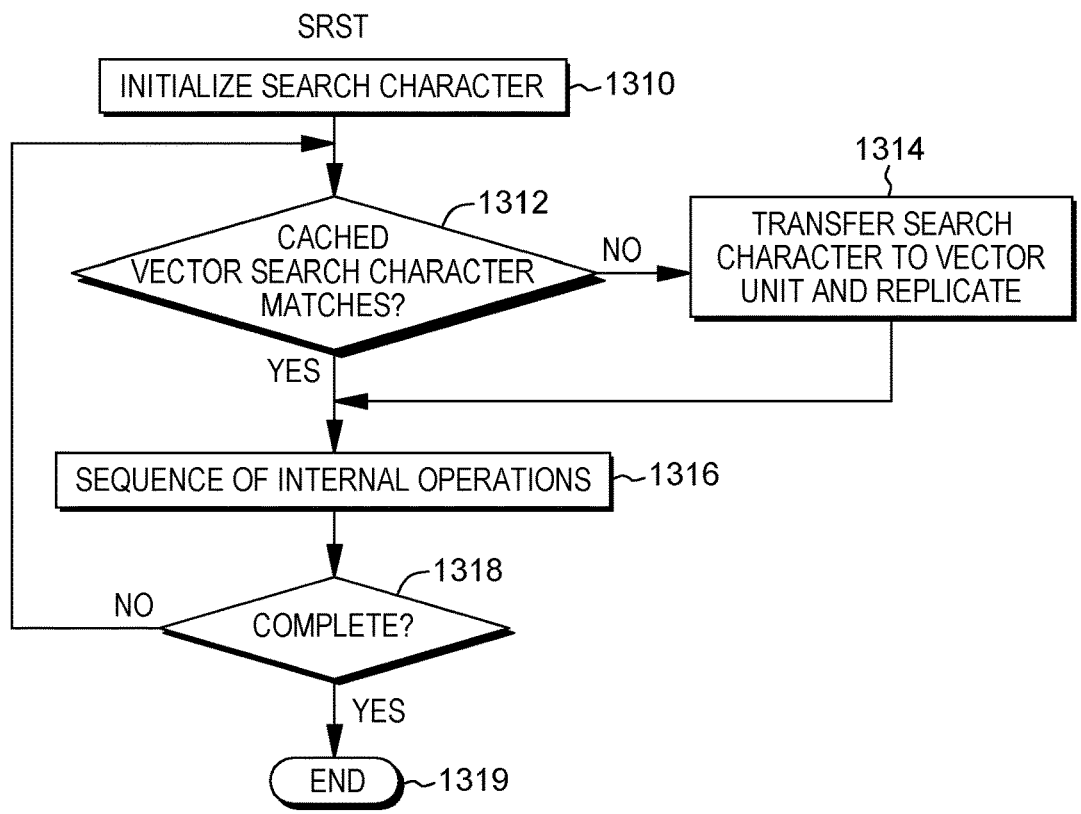

In a further embodiment, referring to FIG. 13B, the latency of setting eVR0 is avoided. Instead, the most recent search character value is cached in a selected location, e.g., a register, such as a vector register. Initially, a search character is initialized, STEP 1310, and a determination is made as to whether a cached vector search character matches the initialized search character, INQUIRY 1312. If it does not match, then the search character is transferred to the vector unit and replicated, STEP 1314, as described above. In one example, a compare vector to scalar instruction is used to compare the search character, and if necessary, branch to a VREP instruction to replicate the search character (e.g., CVSJ <R0>, <eVR0>, EQ, cached_ok; compare vector to scalar replicate and jump-skip initialization of vector register if it is a replicated scalar as specified; cached_ok is at VLBB in the sequence of operations). Thereafter, or if the cached vector search character does match, then processing continues with a sequence of internal operations used to perform the chosen operation (e.g., search or other operation) absent the search loop of the architected version, as described above, STEP 1316. A determination is made as to whether the search (or other) operation is complete, INQUIRY 1318. If so, processing ends, STEP 1319; otherwise, the check loop processing is entered and processing continues to INQUIRY 1312.

Figure 13C:
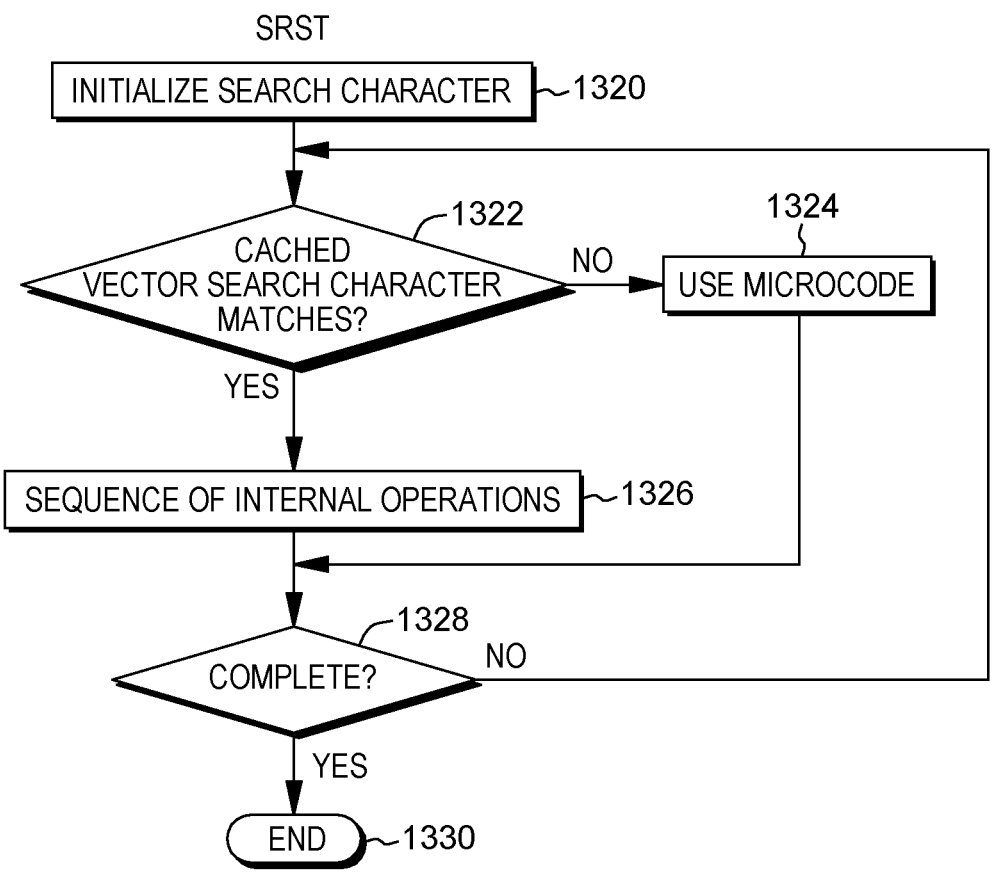

In yet a further embodiment, referring to FIG. 13C, a search character is initialized, STEP 1320, and a determination is made as to whether a cached vector search character matches the initialized search character, INQUIRY 1322. If it does not match, then microcode is used to perform the search operation (or other operation), STEP 1324. However, if the cached vector search character does match the initialized search character, then a sequence of internal operations is used to perform the chosen operation (e.g., search or other operation) absent the search loop of the architected version, as described above, STEP 1326.

Subsequent to performing the sequence of operations or the microcode, a determination is made as to whether the search (or other) operation is complete, INQUIRY 1328. If so, processing ends, STEP 1330; otherwise, the check loop processing is entered and processing continues to INQUIRY 1322.

Figure 13D:
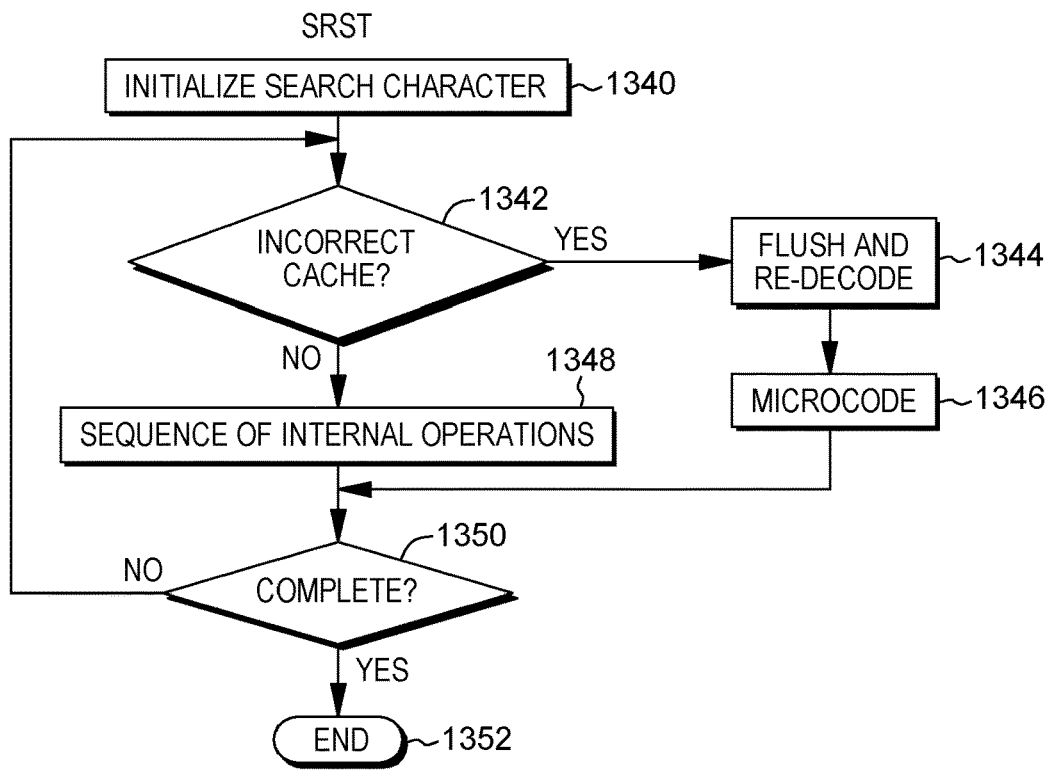

In yet a further embodiment, referring to FIG. 13D, a search character is initialized, STEP 1340, and a determination is made as to whether a cached search character is equal to the initialized search character, INQUIRY 1342. This test may execute in parallel and/or out-of-order with respect to the internal operations of STEP 1348. If the cached search character is incorrect, the decode internal operation sequence corresponding toe STEP 1348 is flushed from the microprocessor pipeline and the string instruction (e.g., SRST or other instruction) is re-decoded into a sequence transferring to microcode, STEP 1344, and the instruction (e.g., SRST or other instruction) is performed using microcode, STEP 1346. However, if the cached search character is correct, then a sequence of internal operations is used to perform the chosen operation (e.g., search or other operation) absent the search loop of the architected version, as described above, STEP 1348. Thereafter, or subsequent to the microcode processing, a determination is made as to whether the chosen operation is complete, INQUIRY 1350.

If so, processing ends, STEP 1352; otherwise, the check loop processing is entered and processing continues to INQUIRY 1342.

Figure 13E:
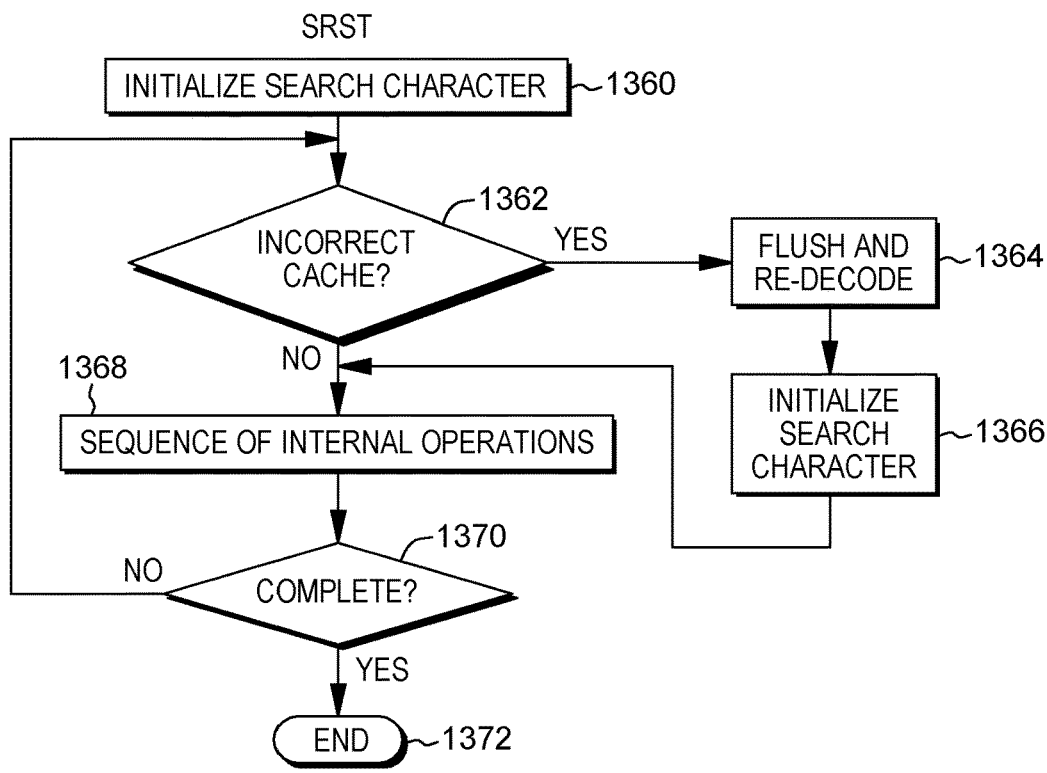

In yet a further embodiment, referring to FIG. 13E, speculative decoding is performed. Initially, a search character is initialized, STEP 1360, and a determination is made as to whether a cached version of the search character is the same as the initialized search character, INQUIRY 1362. This test may execute in parallel and/or out-of-order with respect to the internal operations of STEP 1368. If the cached version is incorrect, then the decode internal operation sequence corresponding to STEP 1368 is flushed and the string instruction (e.g., SRST, or other instruction) is re-decoded in an alternate form updating the cached search character in an example register, e.g., eVR0, STEP 1364. The search character in the register or other location used to cache a search character is initialized again to the value of general register 0, STEP 1366. In one example, the VREP instruction is used to replicate the search character. After re-initializing the search character, or if the speculatively decoded cached version is correct, a sequence of internal operations is used to perform the chosen operation (e.g., search, or other operation), STEP 1368. Thereafter, a determination is made as to whether the chosen operation is complete, INQUIRY 1370. If so, processing ends, STEP 1372; otherwise, the check loop processing is entered and processing continues to INQUIRY 1362.

In another embodiment, instead of performing a test and speculative recovery (e.g., flush and re-decode) for the selected character, an indicator is provided specifying whether R0 has been changed since the last issuance of the SRST instruction. Other embodiments are also possible.

Further, in accordance with this embodiment, the indicator is updated when general register 0 is modified such that a cached character no longer corresponds to the selected character. In another embodiment, a comparison of an updated value of general register 0 is performed when general register 0 is updated to indicate whether a cached version of the selected character corresponds to general register 0. While these aspects have been described with reference to SRST, these aspects may also be practiced in conjunction with other instructions, for example those including, but not limited to, the MVST and CLST instructions with respect to the management of possible termination characters.

Although various embodiments are described above, modifications may be made without departing from the spirit of aspects of the invention. For instance, although condition codes are set to specific values, in other embodiments, they may be set to other values. Other variations are also possible.

Further, in the instructions described above, the amount of processing performed as a CPU-determined amount is determined by the CPU on the basis of improving system performance. In one embodiment, the amount is the number of bytes that may be efficiently operated on in an operation, e.g., corresponding to the length of a register, such as a vector register where processing may be performed in parallel. In another embodiment, the amount is the number of bytes that may be efficiently operated on without looping. Other examples also exist.

In another embodiment, another processing unit other than a vector unit is used to implement the sequence of operations in accordance with an aspect of the invention.

Described above are examples of architected instructions that may be implemented without microcode using a sequence of non-loop operations. For instance, an architected looping instruction is expanded into a non-looping sequence eliminating the copy/compare/search loop and using a termination check (e.g., termination character) as the main looping structure (the check loop) in the modified definition. In various examples, a replicated termination character or search-for character is stored in a vector register; and/or the replicated termination character or search-for character is in a hidden (architecturally not visible) vector register across invocations of an instruction. Further, as an example, the testing may be speculative testing, and the expanded sequence further includes verifying the speculated termination character or search-for character. The test may be performed in parallel to the processing, either by out-of-order execution, or by distinct parallel data paths, as examples. Further, in another example, where the recovery includes a flush to the in-order checkpoint, the recovery may be performed either in expanded operation sequences, or in microcode. In yet a further example, the termination or testing character is verified by testing an indicator to determine whether architected register R0 has changed since the last invocation of the instruction (e.g., MVST, CLST, SRST), when the hidden vector register has been previously set to a replicated copy of R0. Many other variations are possible.

One or more aspects of the present invention are inextricably tied to computer technology and facilitate processing within a computer, improving performance thereof. Further details of one embodiment of facilitating processing within a computing environment, as it relates to one or more aspects of the present invention, are described with reference to FIGS. 14A-14B.

Referring to FIG. 14A, an instruction to be processed is obtained (1400). The instruction is defined to be a looping instruction (1402), in which a loop is configured to repeat a plurality of times to perform an operation on up to a defined number of units of data (1404). The instruction is processed (1410), and the processing includes, for instance, determining whether an obtained selected character is an expected selected character (1412). Based on the obtained selected character being the expected selected character, an execution process is used that includes a sequence of operations to perform the operation (1414). The sequence of operations replaces the loop and provides a non-looping sequence to perform the operation on up to the defined number of units of data (1416). Further, the sequence of operations is configured to repeat one or more times and to terminate based on the obtained selected character (1418). Based on the obtained selected character being different than the expected selected character, an alternate execution process is chosen (1420).

As examples, the instruction is a move string instruction (1422), a compare string instruction (1424), or a search string instruction (1426).

Figure 14B:
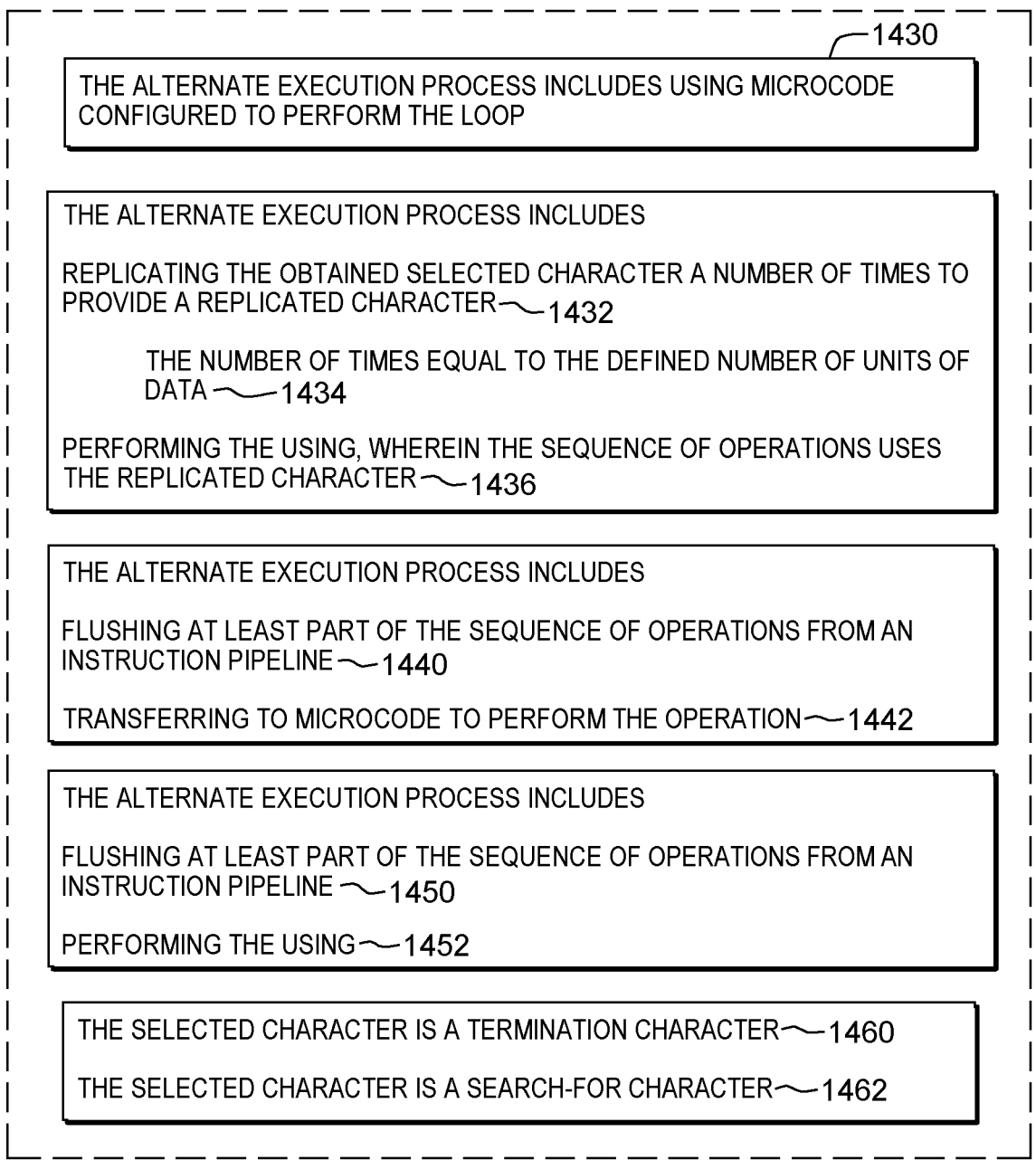

Referring to FIG. 14B, in one implementation, the alternate execution process includes using microcode configured to perform the loop (1430).

In another implementation, the alternate execution process includes replicating the obtained selected character a number of times to provide a replicated character (1432), the number of times equal to the defined number of units of data (1434); and performing the using, in which the sequence of operations uses the replicated character (1436).

In yet another implementation, the alternate execution process includes flushing at least part of the sequence of operations from an instruction pipeline (1440), and transferring to microcode to perform the operation (1442).

Further, in another implementation, the alternate execution process includes flushing at least part of the sequence of operations from an instruction pipeline (1450), and performing the using (1452).

As examples, the selected character is a termination character (1460) or a search-for character (1462).

Many variations are possible without departing from a spirit of aspects of the present invention. It should be noted that numerous aspects and features are described herein, and unless otherwise inconsistent, each aspect or feature may be combinable with any other aspect or feature.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 15:
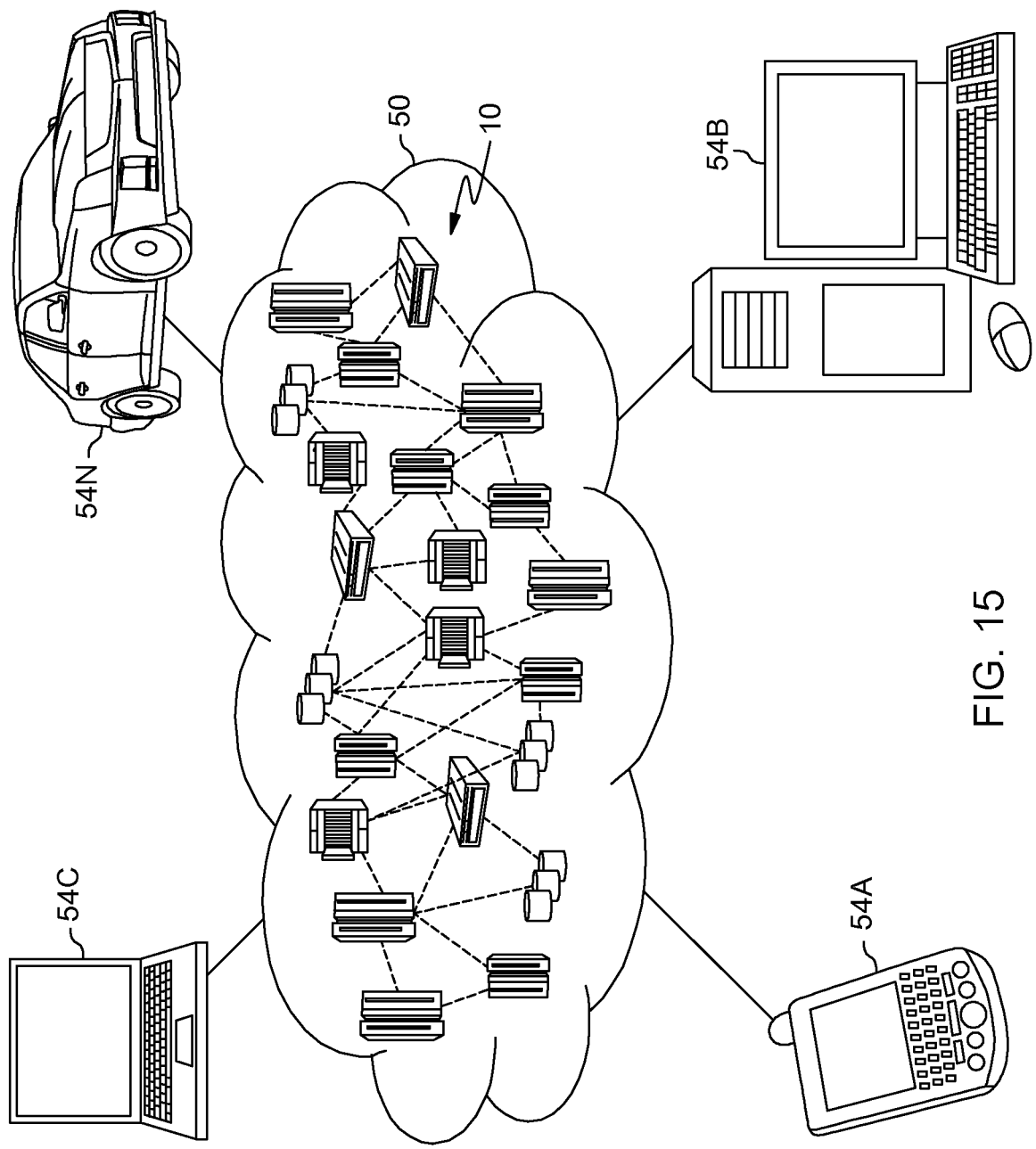
FIG. 15 depicts one embodiment of a cloud computing environment.

Referring now to FIG. 15, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 15 are intended to be illustrative only and that computing nodes 10 and cloud computing environment 50 can communicate with any type of computerized device over any type of network and/or network addressable connection (e.g., using a web browser).

Figure 16:
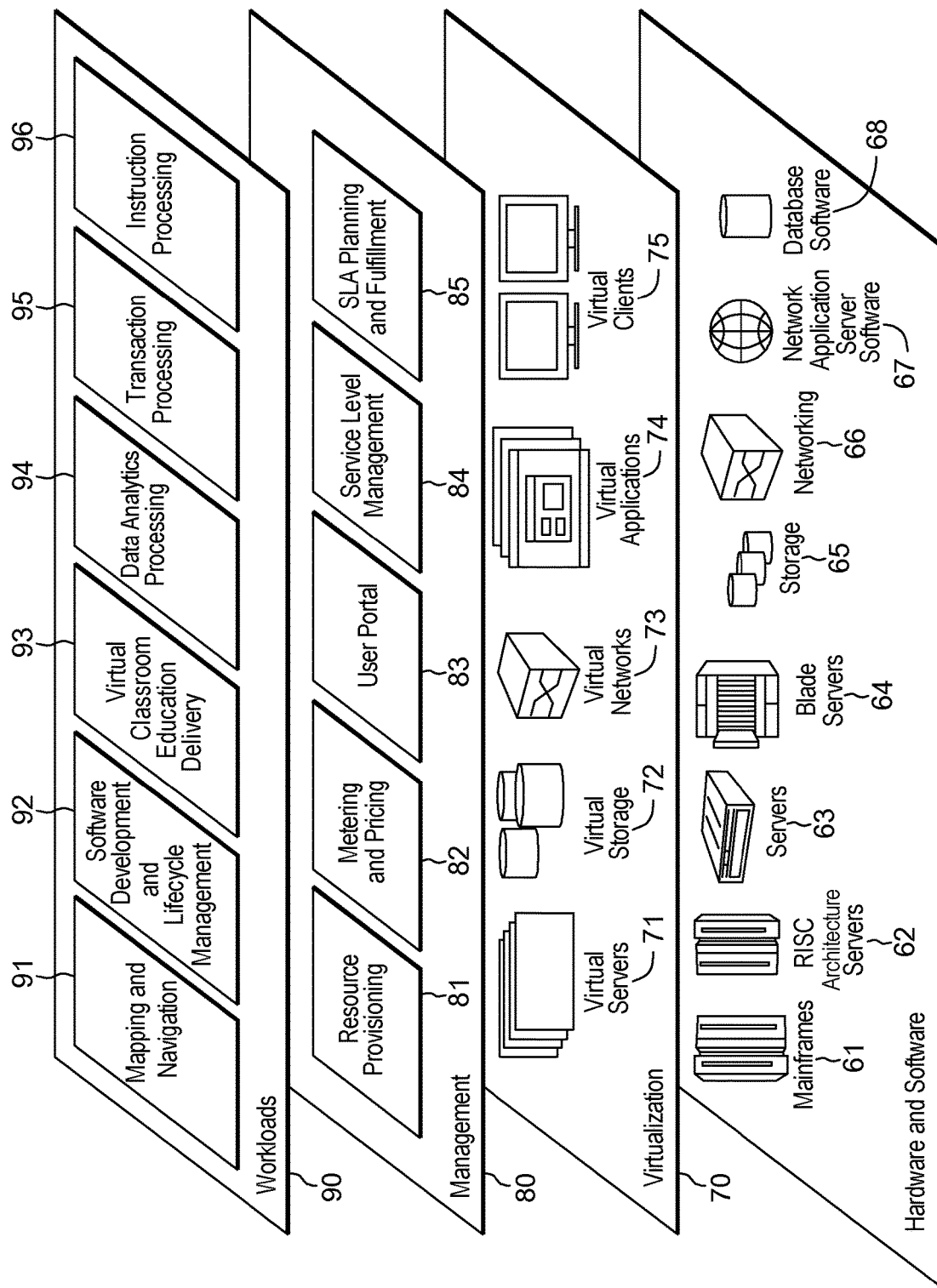
FIG. 16 depicts one example of abstraction model layers.

Referring now to FIG. 16, a set of functional abstraction layers provided by cloud computing environment 50 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and instruction processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
 a computer readable storage medium readable by a processing circuit and storing instructions for performing a method comprising:
  obtaining an instruction to be processed, the instruction defined to be a looping instruction, wherein a loop is configured to repeat a plurality of times to perform an operation on up to a defined number of units of data; and processing the instruction, the processing comprising:
  determining whether an obtained selected character is an expected selected character;
  using, based on the obtained selected character being the expected selected character, an execution process that includes a sequence of operations to perform the operation, the sequence of operations replacing the loop and providing a non-looping sequence to perform the operation on up to the defined number of units of data, and wherein the sequence of operations is configured to repeat one or more times and to terminate based on the obtained selected character; and
  choosing, based on the obtained selected character being different than the expected selected character, an alternate execution process, wherein the alternate execution process comprises:
    flushing at least part of the sequence of operations from an instruction pipeline; and
    performing the using.

2. The computer program product of claim 1, wherein the selected character is a termination character.

3. The computer program product of claim 1, wherein the selected character is a search-for character.

4. The computer program product of claim 1, wherein the instruction is a move string instruction.

5. The computer program product of claim 1, wherein the instruction is a compare string instruction.

6. The computer program product of claim 1, wherein the instruction is a search string instruction.

7. A computer system for facilitating processing within a computing environment, the computer system comprising:
  a memory; and
  a processor in communication with the memory, wherein the processor is configured to perform a method, said method comprising:
    obtaining an instruction to be processed, the instruction defined to be a looping instruction, wherein a loop is configured to repeat a plurality of times to perform an operation on up to a defined number of units of data; and
    processing the instruction, the processing comprising:
      determining whether an obtained selected character is an expected selected character;
      using, based on the obtained selected character being the expected selected character, an execution process that includes a sequence of operations to perform the operation, the sequence of operations replacing the loop and providing a non-looping sequence to perform the operation on up to the defined number of units of data, and wherein the sequence of operations is configured to repeat one or more times and to terminate based on the obtained selected character; and
      choosing, based on the obtained selected character being different than the expected selected character, an alternate execution process, wherein the alternate execution process comprises:
        flushing at least part of the sequence of operations from an instruction pipeline; and
        performing the using.

8. The computer system of claim 7, wherein the selected character is a termination character.

9. The computer system of claim 7, wherein the selected character is a search-for character.

10. The computer system of claim 7, wherein the instruction is a move string instruction.

11. The computer system of claim 7, wherein the instruction is a compare string instruction.

12. The computer system of claim 7, wherein the instruction is a search string instruction.

* * * * *